(12) United States Patent
Okamoto et al.

(10) Patent No.: US 12,427,992 B2
(45) Date of Patent: Sep. 30, 2025

(54) METHOD FOR INSPECTING ROAD SURFACE CONDITION, ROAD SURFACE CONDITION INSPECTION DEVICE, AND ROAD SURFACE CONDITION INSPECTION SYSTEM

(71) Applicant: TOYOTA JIDOSHA KABUSHIKI KAISHA, Toyota (JP)

(72) Inventors: Yuki Okamoto, Hadano (JP); Kosuke Futagami, Mishima (JP); Yoshinori Watanabe, Isehara (JP); Atsushi Sone, Susono (JP); Sho Amagai, Susono (JP); Atsushi Kodama, Shizuoka-ken (JP); Yosuke Hirate, Shizuoka-ken (JP); Taichi Kawanai, Susono (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 18/165,451

(22) Filed: Feb. 7, 2023

(65) Prior Publication Data

US 2023/0264696 A1 Aug. 24, 2023

(30) Foreign Application Priority Data

Feb. 16, 2022 (JP) ................................. 2022-022220

(51) Int. Cl.
*B60W 40/06* (2012.01)
*B60W 60/00* (2020.01)
(Continued)

(52) U.S. Cl.
CPC ...... *B60W 40/06* (2013.01); *B60W 60/00182* (2020.02); *G06V 20/588* (2022.01);
(Continued)

(58) Field of Classification Search
CPC ........... B60W 40/06; B60W 60/00182; B60W 2555/20; B60W 2420/403; G06V 20/59;
(Continued)

(56) References Cited

U.S. PATENT DOCUMENTS 10,866,106 B2   12/2020 Arakawa
10,991,176 B2   4/2021 Yoshizaki et al.
(Continued)

FOREIGN PATENT DOCUMENTS

JP   2011-63106 A       3/2011
JP   2015040755 A   *   3/2015
(Continued)

*Primary Examiner* — Adam R Mott
(74) *Attorney, Agent, or Firm* — Sughrue Mion, PLLC

(57) ABSTRACT

A method for inspecting a road surface condition includes the steps of obtaining detailed information on a road surface condition set for each inspection point based on a traveling record of a vehicle, and information on an own position of the vehicle, generating an inspection execution plan of the vehicle in the inspection point when the inspection point is included in a predetermined range in an advancing direction of the vehicle with the own position as a reference, performing evaluation of a road surface condition in the inspection point based on a traveling condition of the vehicle that is obtained during the inspection execution plan, and updating the detailed information on a road surface condition set for the inspection point based on latest information on the road surface condition the evaluation of which is performed.

16 Claims, 27 Drawing Sheets

(51) Int. Cl.
*G06V 20/56* (2022.01)
*G06V 20/59* (2022.01)

(52) U.S. Cl.
CPC ....... *G06V 20/59* (2022.01); *B60W 2420/403* (2013.01); *B60W 2555/20* (2020.02)

(58) Field of Classification Search
CPC ........ G06V 20/588; G06Q 10/20; G01C 7/04; B60T 8/172; G08G 1/0116; E01C 23/01
See application file for complete search history.

(56) References Cited

U.S. PATENT DOCUMENTS

| | | | |
|---|---|---|---|
| 10,991,254 B2 | 4/2021 | Hayashi et al. | |
| 11,048,263 B2 | 6/2021 | Urano | |
| 11,052,780 B2 | 7/2021 | Taguchi et al. | |
| 11,281,215 B2 | 3/2022 | Yoshizaki et al. | |
| 12,037,015 B2 * | 7/2024 | Xiang | B60W 50/0205 |
| 2009/0179777 A1 * | 7/2009 | Ishikawa | G01M 15/042 |
| | | | 340/939 |
| 2013/0138472 A1 * | 5/2013 | Hasegawa | G06Q 10/20 |
| | | | 705/7.26 |
| 2019/0128694 A1 | 5/2019 | Matsushita et al. | |
| 2019/0129438 A1 | 5/2019 | Morita et al. | |
| 2020/0189610 A1 | 6/2020 | Sakai et al. | |
| 2020/0324788 A1 | 10/2020 | Ando | |
| 2021/0001861 A1 * | 1/2021 | Lobey | B60W 40/068 |
| 2021/0072147 A1 | 3/2021 | Yang et al. | |

FOREIGN PATENT DOCUMENTS

| | | | |
|---|---|---|---|
| JP | 2018-120409 A | | 8/2018 |
| JP | 2019108755 A | * | 7/2019 |
| JP | 2021-110092 A | | 8/2021 |

* cited by examiner

METHOD FOR INSPECTING ROAD SURFACE CONDITION, ROAD SURFACE CONDITION INSPECTION DEVICE, AND ROAD SURFACE CONDITION INSPECTION SYSTEM

CROSS-REFERENCE TO RELATED APPLICATION

The present application claims priority under 35 U.S.C. § 119 to Japanese Patent Application No. 2022-022220, filed Feb. 16, 2022, the contents of which application are incorporated herein by reference in their entirety.

BACKGROUND

Technical Field

The present disclosure relates to a method, a device, and a system for inspecting a road surface condition.

Background Art

Patent Literature 1 discloses an art of estimating a road surface u of a target road for generation of a driving plan when generating a future traveling trajectory (driving plan) of an own vehicle. In this art, information on a traveling record of the own vehicle or another vehicle is used at the time of estimation of the road surface u. As the information on a traveling record, longitudinal acceleration, lateral acceleration and the position of a road are illustrated. When information on a traveling record exists in the position of the road ahead of the own vehicle, the road surface u is estimated based on the information on the longitudinal acceleration and the lateral acceleration in this position.

List of Related Art

Patent Literature 1: JP 2011-063106 A

SUMMARY

However, the information on the road surface condition represented by the road surface u changes from moment to moment. Therefore, for example, when a present value of the road surface u is smaller than an estimated value of the road surface u calculated by using the traveling record, the road surface condition is a slippery condition. Accordingly, in order to secure traveling safety of the own vehicle, freshness of information on the road surface condition is desirably maintained.

One object of the present disclosure is to provide an art that can maintain freshness of information on a road surface condition.

A first aspect relates to a method for inspecting a road surface condition for performing inspection of a road surface condition.

The method for inspecting a road surface condition includes the steps of:
 obtaining detailed information on a road surface condition set for each of inspection points based on a traveling record of a vehicle, and information on an own position of the vehicle;
 generating an inspection execution plan of the vehicle in each of the inspection points when the each of the inspection points is included in a predetermined range in an advancing direction of the vehicle with the own position as a reference;
 performing evaluation of a road surface condition in the each of the inspection points based on a traveling condition of the vehicle obtained during the inspection execution plan; and
 updating the detailed information on a road surface condition set for the each of the inspection points based on latest information on the road surface condition the evaluation of which is performed.

A second aspect further includes a following feature in addition to the first aspect.

The step of generating the inspection execution plan includes a step of setting a priority order of two or more of the inspection points when the two or more of the inspection points are included in the predetermined range.

A third aspect further includes a following feature in addition to the second aspect.

The step of setting the priority order includes the steps of:
 obtaining information on weather;
 predicting changes in road surface conditions in the two or more of the inspection points included in the predetermined range based on the information on weather; and
 setting a higher priority order to an inspection point with a larger prediction change in the road surface condition.

A fourth aspect further includes a following feature in addition to the second aspect.

The step of setting the priority order includes the steps of:
 obtaining surrounding environment information in the advancing direction of the vehicle captured by a camera mounted on the vehicle;
 predicting changes in road surface conditions in the two or more of the inspection points included in the predetermined range based on the surrounding environment information in the advancing direction of the vehicle; and
 setting a higher priority order to an inspection point with a larger prediction change in the road surface condition.

A fifth aspect further includes a following feature in addition to any one aspect of the second aspect to the fourth aspect.

The step of generating the inspection execution plan further includes a step of calculating an interval between two adjacent inspection points when a priority order is set for the two or more of the inspection points included in the predetermined range, and
 when the interval is less than a predetermined distance, the inspection execution plan is generated with respect to an inspection point having a relatively high priority order, and when the interval is the predetermined distance or more, the inspection execution plan is generated with respect to each of both the two adjacent inspection points.

A sixth aspect further includes a following feature in addition to any one aspect of the first aspect to the fifth aspect.

The sixth aspect further includes a step of determining whether or not abnormality of the vehicle is detected during the inspection execution plan,
 wherein when it is determined that abnormality of the vehicle is detected, execution of the evaluation of the road surface condition based on a traveling condition of the vehicle to be obtained during the inspection execution plan is stopped, or update of the detailed information on a road surface condition based on the latest information on the road surface condition the evaluation of which is performed is stopped.

A seventh aspect further includes a following feature in addition to the first aspect.

The seventh aspect further includes a step of determining whether or not a predetermined execution avoidance condition is satisfied before execution of the inspection execution plan,
 wherein execution of the inspection execution plan is stopped when it is determined that the predetermined execution avoidance condition is satisfied.

An eighth aspect further includes a following feature in addition to the seventh aspect.

The predetermined execution avoidance condition includes at least one of a fact that an occupant is recognized in an interior of the vehicle, and a fact that an object is recognized in a predetermined area.

A ninth aspect further includes a following feature in addition to any one aspect of the first aspect to the eighth aspect.

The ninth aspect further includes a step of determining whether or not a predetermined generation avoidance condition is satisfied before generation of the inspection execution plan, wherein when it is determined that the predetermined generation avoidance condition is satisfied, generation of the inspection execution plan is stopped.

A tenth aspect further includes a following feature in addition to any one aspect of the first aspect to the sixth aspect.

The tenth aspect further includes the steps of:
 determining whether or not an object is recognized in a predetermined area; and
 changing a travel plan of the vehicle included in the inspection execution plan before execution of the inspection execution plan, when it is determined that the object is recognized in the predetermined area,
 wherein a travel plan after changed by the step of changing the travel plan includes a travel plan that suppresses approaching the object.

An eleventh aspect further includes a following feature in addition to any one aspect of the first aspect to the tenth aspect.

The detailed information on a road surface condition includes at least one of information on slipperiness of a road surface, information related to unevenness of a road surface, information related to a gradient of a road surface, information related to a shape of a road surface, information on an upper speed limit, and information on an operation record of a traveling safety function.

A twelfth aspect relates to a road surface condition inspection device that performs inspection of a road surface condition.

The road surface condition inspection device includes one or a plurality of storage devices that store detailed information on a road surface condition set for each inspection point based on a traveling record of a vehicle, and information on an own position of the vehicle, and one or a plurality of processors.

The one or the plurality of processors, when the inspection point is included in a predetermined range in an advancing direction of the vehicle with the own position as a reference, generate an inspection execution plan of the vehicle in the inspection point.

The one or the plurality of processors perform evaluation of a road surface condition in the inspection point, based on a traveling condition of the vehicle that is obtained during the inspection execution plan.

The one or the plurality of processors update the detailed information on a road surface condition that is set for the inspection point, based on latest information on the road surface condition the evaluation of which is performed.

A thirteenth aspect relates to a road surface condition inspection system that performs inspection of a road surface condition.

The road surface condition inspection system includes a vehicle, and a management device communicable with the vehicle.

The vehicle includes a road surface condition inspection device including a first processor and a first storage device, and a vehicle side communication device.

The management device includes a second processor, a second storage device, and a management side communication device.

The first storage device includes information on an own position of the vehicle.

The second storage device includes detailed information on a road surface condition that is set for each inspection point based on a traveling record of the vehicle.

The first processor obtains the detailed information on a road surface condition from the management device.

When the inspection point is included in a predetermined range in an advancing direction of the vehicle with the own position as a reference, the first processor generates an inspection execution plan of the vehicle in the inspection point.

The first processor performs evaluation of a road surface condition in the inspection point based on a traveling condition of the vehicle that is obtained during the inspection execution plan.

The first processor transmits latest information on the road surface condition the evaluation of which is performed to the management device.

The second processor updates the detailed information on a road surface condition set for the inspection point based on the latest information on the road surface condition.

A fourteenth aspect relates to a road surface condition inspection system that performs inspection of a road surface condition.

The road surface condition inspection system includes a vehicle, and a management device communicable with the vehicle.

The vehicle includes a road surface condition inspection device including a first processor, and a first storage device, and a vehicle side communication device.

The management device includes a second processor, a second storage device, and a management side communication device.

The first storage device includes information on an own position of the vehicle.

The second storage device includes detailed information on a road surface condition that is set for each inspection point based on a traveling record of the vehicle.

When the inspection point is included in a predetermined range in an advancing direction of the vehicle with the own position as a reference, the second processor generates an inspection execution plan of the vehicle in the inspection point.

The second processor transmits the inspection execution plan to the road surface condition inspection device.

The first processor transmits a traveling condition of the vehicle obtained during the inspection execution plan to the management device.

The second processor performs evaluation of a road surface condition in the inspection point based on the traveling condition of the vehicle.

The second processor updates the detailed information on a road surface condition set for the inspection point based on latest information on the road surface condition the evaluation of which is performed.

A fifteenth aspect further includes a following feature in addition to the thirteenth aspect or the fourteenth aspect.

Before updating the detailed information on a road surface condition set for the inspection point based on the latest information on the road surface condition, the second processor determines whether or not the latest information on the road surface condition is abnormal based on a result of comparing the latest information on the road surface condition, and detailed information on a road surface condition based on a traveling record of other vehicles in a same inspection point as an inspection point of the latest information on the road surface condition.

According to the first aspect, it becomes possible to perform inspection of the road surface condition in the inspection point based on the traveling record and update the detailed information on a road surface condition based on the latest information on the road surface condition. Accordingly, it becomes possible to maintain freshness of the detailed information on a road surface condition.

According to the second aspect, when two or more of the inspection points are included in the predetermined range in the advancing direction of the vehicle, the priority order of these inspection points is set. Thereby, when the two or more of the inspection points are included in the predetermined range, it becomes possible to reliably perform inspection in the inspection point having a high priority order.

According to the third aspect, when the two or more of the inspection points are included in the predetermined range, a higher priority is set for the inspection point with a larger change in the road surface condition predicted based on the information on weather. Accordingly, it becomes possible to reliably perform inspection in the inspection point with a large change in the road surface condition and update the detailed information on the inspection point.

According to the fourth aspect, when the two or more of the inspection points are included in the predetermined range, a higher priority order is set for an inspection point with a larger change in the road surface condition predicted based on information on at least one of a camera image in the advancing direction of the vehicle and an infrastructure camera image. Accordingly, a same effect as the effect of the third aspect is obtained.

According to the fifth aspect, when a priority order is set for the two or more of the inspection points, the interval between the two adjacent inspection points is calculated. When the interval is less than the predetermined distance, the inspection execution plan is generated with respect to the inspection point having a relatively high priority order. Therefore, in this case, it becomes possible to reliably perform inspection in the inspection point having a relatively high priority order. When the interval between the two adjacent inspection points is the predetermined distance or more, the inspection execution plan is generated with respect to each of both the inspection points. Therefore, in this case, it becomes possible to perform inspection in these inspection points regardless of the priority order.

According to the sixth aspect, when abnormality of the vehicle is detected, execution of evaluation of the road surface condition is stopped or update of the detailed information on a road surface condition is stopped. Thereby, it is possible to update the detailed information on a road surface condition based on the appropriate latest information on the road surface condition.

According to the seventh aspect, when the predetermined execution avoidance condition is satisfied, execution of the inspection execution plan is stopped. Thereby, it becomes possible not to perform inspection to the road surface condition that is not a subject of inspection.

According to the eighth aspect, when the predetermined execution avoidance condition includes at least one of the facts that a passenger is recognized in the interior of the vehicle and that an object is recognized in the predetermined area, execution of the inspection execution plan is stopped. Thereby, it becomes possible not to perform inspection to the road surface condition that is not a subject of inspection.

According to the ninth aspect, when the predetermined generation avoidance condition is satisfied, generation of the inspection execution plan is stopped. Thereby, it becomes possible not to perform inspection to the road surface condition that is not a subject of inspection.

According to the tenth aspect, when an object is recognized in the predetermined area, the travel plan of the vehicle included in the inspection execution plan is changed to the travel plan that suppresses approaching the object before execution of the inspection execution plan. Thereby, it becomes possible to perform inspection of the road surface condition while ensuring traveling safety of the vehicle and the object.

According to the eleventh aspect, it becomes possible to manage at least one of information on slipperiness of a road surface, information related to unevenness of a road surface, information related to a gradient of a road surface, information related to a shape of a road surface, information on an upper speed limit, and information on an operation record of a traveling safety function.

According to the twelfth aspect, a same effect as the effect of the first aspect is obtained.

According to the thirteenth aspect, it becomes possible to share the detailed information on a road surface condition with other vehicles and the like by including the vehicle, and the management device communicable with the vehicle.

According to the fourteenth aspect, it becomes possible to share the detailed information on a road surface condition with other vehicles and the like by including the vehicle, and the management device communicable with the vehicle. Furthermore, it becomes possible to reduce a processing load on the road surface condition inspection device by performing the processes other than the inspection execution plan in the management device.

According to the fifteenth aspect, before updating the detailed information on a road surface condition set for the inspection point based on the latest information on the road surface condition, comparison of the latest information on the road surface condition, and the detailed information on a road surface condition based on the traveling record of the other vehicles in the same inspection point as the inspection point of the latest information on the road surface condition is performed. When it is determined that the latest information on the road surface condition is abnormal as a result of performing the comparison, update of the detailed information on a road surface condition based on the latest information on the road surface condition is stopped. Thereby, it becomes possible to share the appropriate detailed information on a road surface condition with the other vehicles and the like.

DETAILED DESCRIPTION

A method for inspecting a road surface condition, a road surface condition inspection device, and a road surface condition inspection system according to each of embodiments of the present disclosure are described with reference to the accompanying drawings. Note that the method for inspecting a road surface condition according to each of the embodiments is realized by computer processing of a road surface condition inspection device or a road surface condition inspection system of each of embodiments.

First Embodiment

1. Overview

A road surface condition inspection device according to a first embodiment is mounted on a vehicle to inspect a road surface condition. The road surface condition inspection device controls the vehicle. The road surface condition inspection device is typically mounted on a vehicle. At least a part of the road surface condition inspection device may be positioned in an external device outside of the vehicle, or may control the vehicle remotely. In other words, the road surface condition inspection device may be dispersedly disposed at the vehicle and the external device. Further, the vehicle controlled by the road surface condition inspection device is an autonomous driving vehicle. In an autonomous driving vehicle, perception, prediction, and judgement of a road surface condition that have been conventionally handled by a driver (or a remote operator) of a vehicle are performed by a road surface condition inspection device 10.

Figure 1:
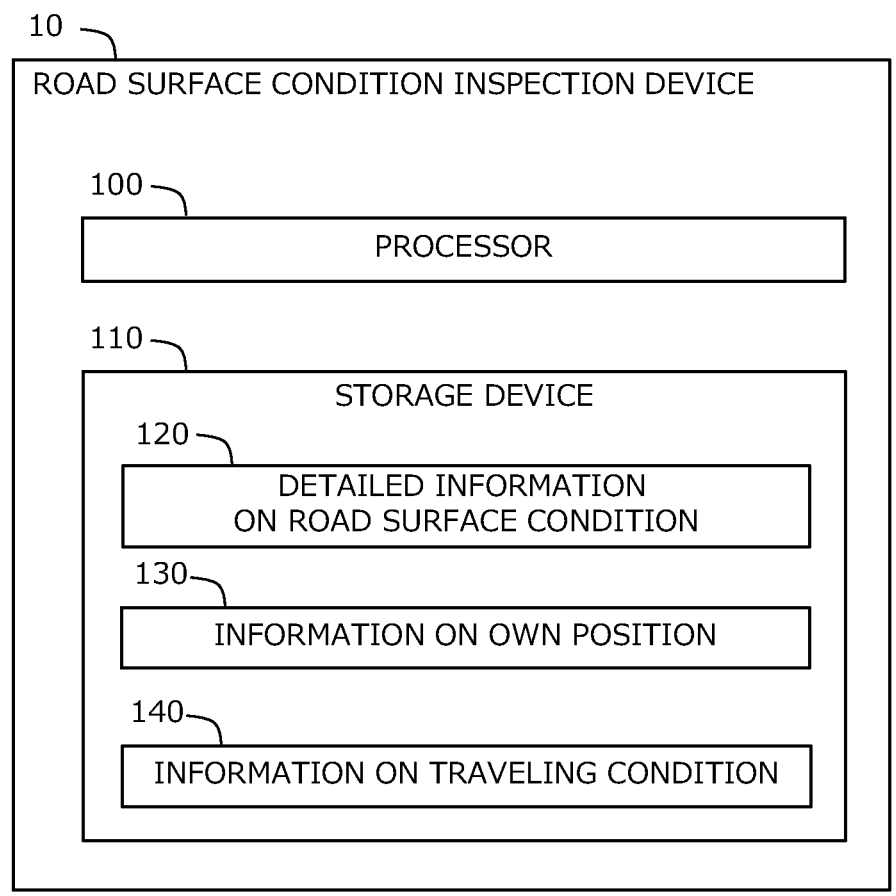
FIG. 1 is a block diagram showing a configuration example of a road surface condition inspection device according to a first embodiment.

FIG. 1 shows a configuration example of the road surface condition inspection device 10 according to the first embodiment. The road surface condition inspection device 10 performs various kinds of information processing. The road surface condition inspection device 10 includes one or a plurality of processors 100 (hereinafter, simply referred to as a processor 100), and one or plurality of storage devices 110 (hereinafter, simply referred to as the storage device 110). The processor 100 executes various processes. For example, as the processor 100, CPU, ECU and the like are cited. The storage device 110 stores data on detailed information 120 on a road surface condition, data on information 130 on an own position, and data on information 140 on a traveling condition. As the storage device 110, a volatile memory, a nonvolatile memory, HDD, SSD and the like are illustrated. The processor 100 executes a road surface condition inspection program that is a computer program, and thereby functions of the road surface condition inspection device 10 are realized. The road surface condition inspection program is stored in the storage device 110. The road surface condition inspection program may be recorded in a computer-readable storage medium. The road surface condition inspection program may be provided via a network.

Figure 2:
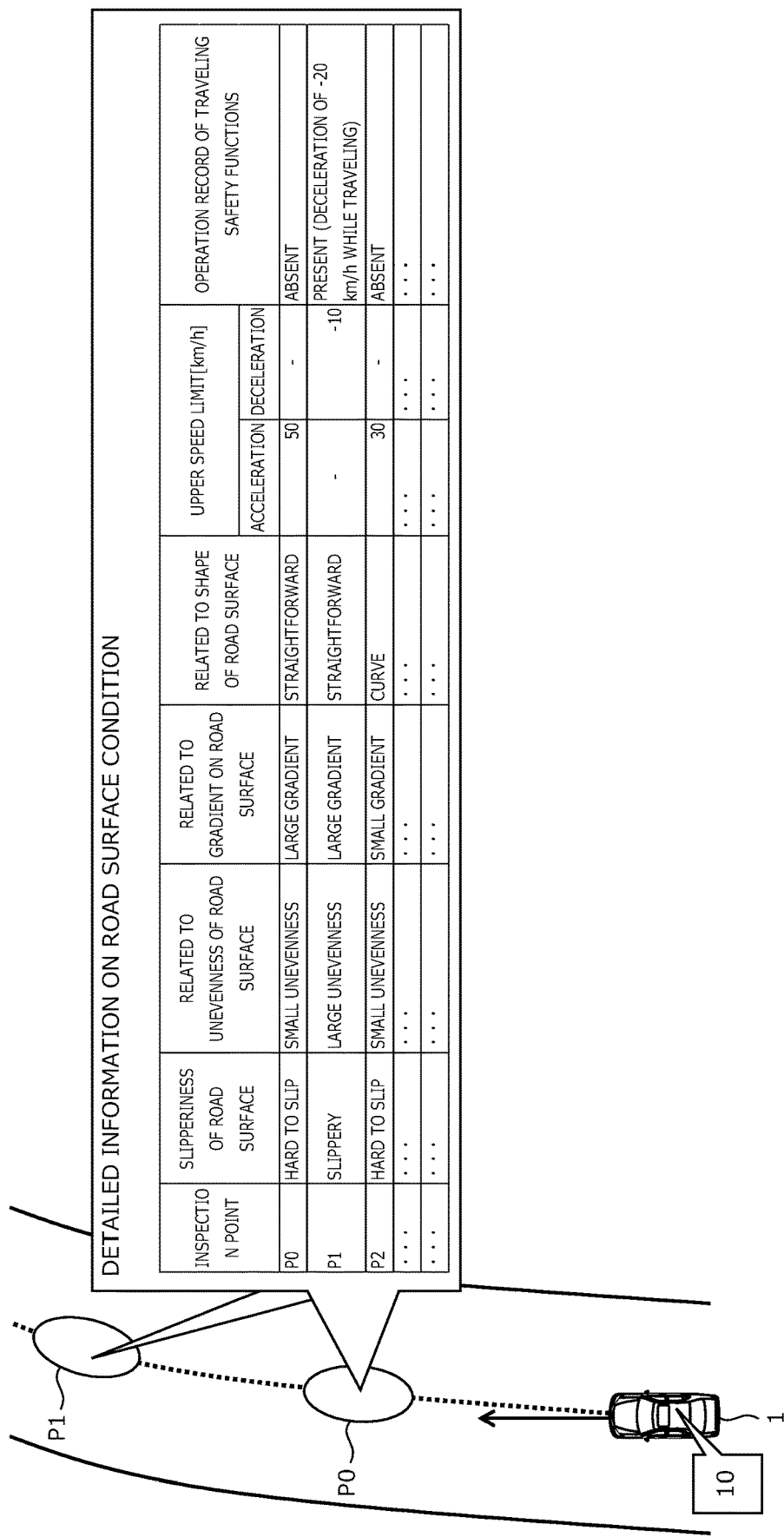
FIG. 2 is a diagram showing an outline of detailed information on a road surface condition stored in a storage device of the road surface condition inspection device according to the first embodiment.

As shown in FIG. 2, the detailed information 120 on a road surface condition includes details of the road surface condition that is set for each inspection point based on a traveling record. The inspection point indicates an inspection range in an advancing direction of a vehicle 1. The inspection range may be a position on a traveling route or a region where the position on the traveling route is included and the vehicle 1 can travel. As the detailed information 120 on a road surface condition, there are illustrated information on slipperiness on a road surface, information related to unevenness of a road surface, information related to a gradient on a road surface, information related to a shape of a road surface, information on an upper speed limit, information on an operation record of traveling safety functions, and the like. The information on the slipperiness of the road surface is information including whether the road surface is "slippery" or "hard to slip" and may be information on a coefficient of friction indicating slipperiness of the road surface. The information related to unevenness of the road surface is information including "large unevenness" or "small unevenness" of the road surface and may be information on an unevenness amount of the road surface, or information on an unevenness level indicating a degree of unevenness in levels. The information related to a gradient of the road surface is information including "a large gradient" or "a small gradient" of the road surface and may be information on a gradient level indicating a degree related to a gradient in levels. The information related to the shape of a road surface is information including a shape of the road surface being "straightforward" or "curve" and may be information on a vehicle operation indicating a steering angle of the vehicle 1 corresponding to the shape of the road surface. The upper speed limit means information including an upper limit value of acceleration or an upper limit value of deceleration. The operation record of the traveling safety functions means information that records whether or not the traveling safety functions such as ABS (Antilock Brake System) have been operated. In the record information, information on a speed at which the vehicle 1 is traveling when the function is operated may be recorded.

The information 130 on an own position means information indicating the own position of the vehicle 1. The information 140 on a traveling condition means the information indicating the traveling condition of the vehicle 1 obtained when the vehicle 1 executes inspection. The information 140 on a traveling condition includes acceleration information in the longitudinal direction and the lateral direction obtained from an acceleration sensor mounted on the vehicle 1, wheel rotational speed information obtained from a wheel rotational speed sensor mounted on the vehicle 1, speed information estimated based on at least one of the acceleration information and the wheel rotational speed information, information on a detection signal that informs that the traveling safety function has been operated, information on a yaw rate value detected by a yaw rate sensor, tire steering information detected by a steering actuator, information on a motor detected from a drive actuator, and information on a hydraulic brake detected by a braking actuator.

Figure 3:
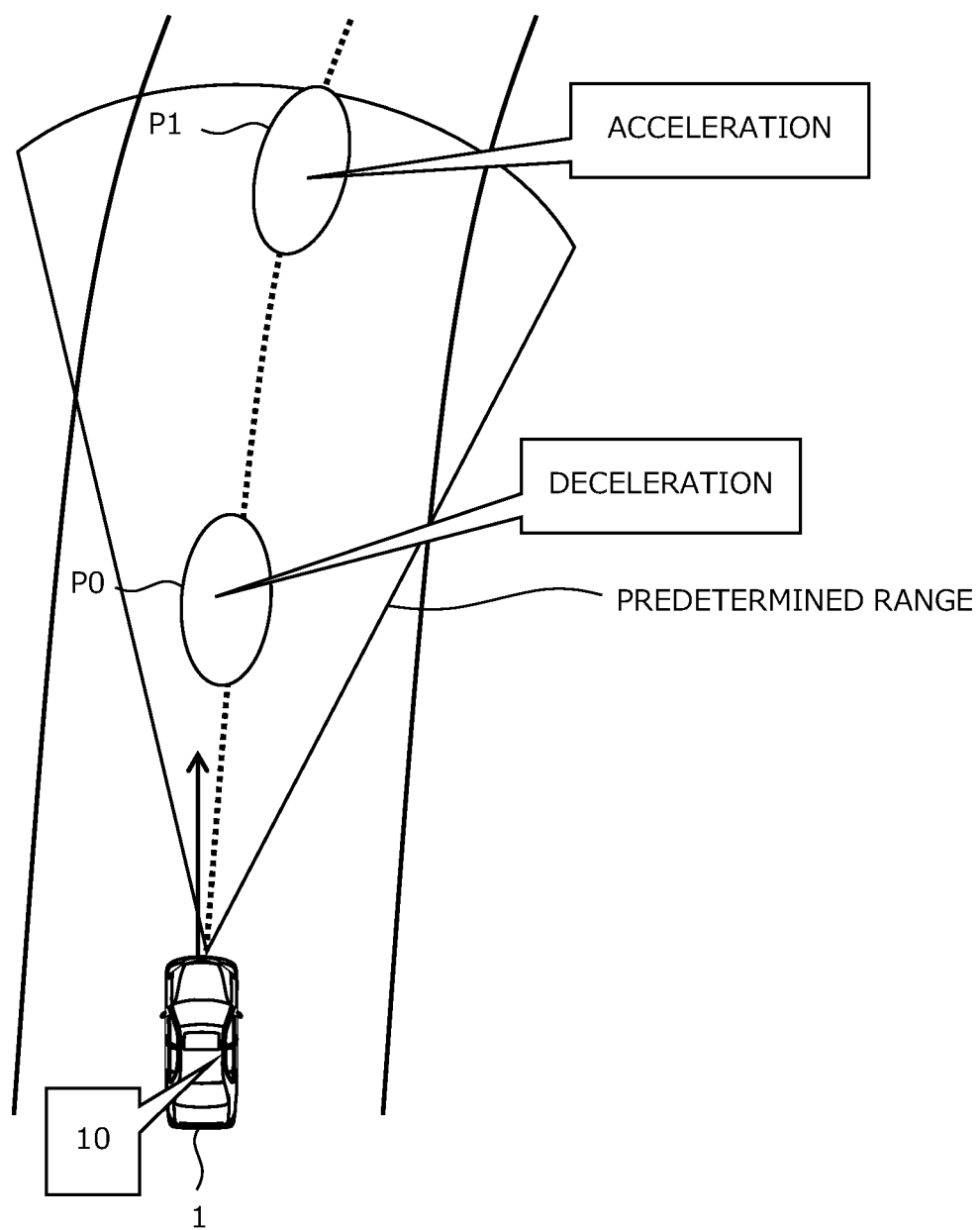
FIG. 3 is a view showing an outline of a traveling inspection plan of the road surface condition inspection device according to the first embodiment.

The road surface condition inspection device 10 performs inspection of a road surface condition based on the detailed information 120 on a road surface condition described above. FIG. 3 shows an inspection outline of the road surface condition. According to FIG. 3, when inspection points based on the traveling record (in the example shown in FIG. 3, two spots that are an inspection point P0 and an inspection point P1) are included in a predetermined range in the advancing direction of the vehicle 1, inspection of the road surface condition for the inspection points is performed. Specifically, when inspection is performed with respect to the road surface conditions of the inspection point P0 and the inspection point P1 that are included in the predetermined range in the advancing direction of the vehicle 1, an inspection execution plan is set for each of the inspection points. The inspection execution plan means a travel plan including a vehicle operation that is used for a purpose of performing inspection of the road surface condition, and different from ordinary vehicle operation. As the vehicle operation, steering, deceleration, acceleration and the like of the vehicle 1 are illustrated. The vehicle operation including at least one of them is set. FIG. 3 illustrates an example in which vehicle operation of deceleration is set in the travel plan of the inspection point P0, and vehicle operation of acceleration is set in the travel plan of the inspection point P1 is set. Thereby, it is possible to perform inspection of the road surface condition at each of the inspection points.

In the road surface condition inspection device 10 according to the first embodiment, the processor 100 executes the road surface condition inspection program, and thereby it is possible to perform inspection of the road surface condition in each of the inspection points as described above. Further, evaluation of the road surface condition in the inspection point is performed based on the information 140 on a traveling condition obtained during the inspection execution plan. Thereby, it is possible to update the detailed information 120 on a road surface condition set for the inspection point based on latest information on the road surface condition the evaluation of which is performed.

Hereinafter, the road surface condition inspection device 10 according to the first embodiment is described in more detail.

2. Specific Example

The road surface condition inspection device 10 generates an inspection execution plan of the vehicle 1 in an inspection point based on the detailed information 120 on a road surface condition, and the information 130 on an own position. Further, the road surface condition inspection device 10 performs evaluation of a road surface condition in the inspection point based on the information 140 on a traveling condition that is obtained during the inspection execution plan. Thereafter, the road surface condition inspection device 10 updates the detailed information 120 on a road surface condition based on the latest information on the road surface condition in the inspection point the evaluation of which is performed. The road surface condition inspection device 10 according to the first embodiment includes a characteristic process as described below.

Figure 4:
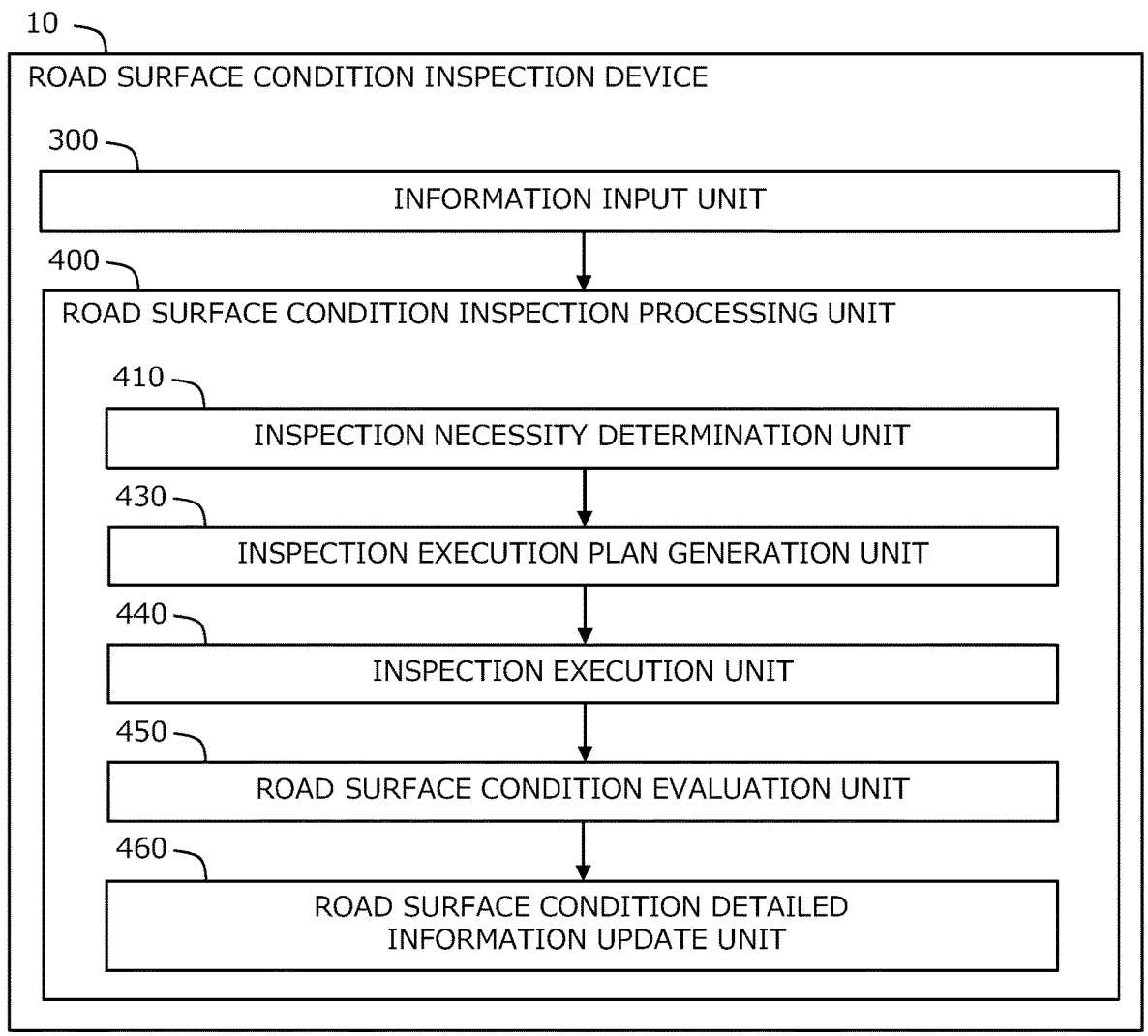
FIG. 4 is a block diagram showing a function example of the road surface condition inspection device according to the first embodiment.

FIG. 4 is a block diagram showing a function example of the road surface condition inspection device 10 according to the first embodiment. The road surface condition inspection device 10 includes an information input unit 300, and a road surface condition inspection processing unit 400 as functional blocks. These functional blocks are realized by the processor 100 executing a road surface condition inspection program.

The information input unit 300 performs a process of receiving the detailed information 120 on a road surface condition, the information 130 on an own position, and the information 140 on a traveling condition that are recorded in the storage device 110. Thereafter, the information input unit 300 performs output of the detailed information 120 on a road surface condition, the information 130 on an own position, and the information 140 on a traveling condition that are received to the road surface condition inspection processing unit 400.

The road surface condition inspection processing unit 400 further includes an inspection necessity determination unit 410, an inspection execution plan generation unit 430, an inspection execution unit 440, a road surface condition evaluation unit 450, and a road surface condition detailed information update unit 460. The road surface condition inspection processing unit 400 generates an inspection execution plan of the vehicle 1 in an inspection point and performs inspection of a road surface condition based on the detailed information 120 on a road surface condition and the information 130 on an own position that are inputted. Further, the road surface condition inspection processing unit 400 performs evaluation of the road surface condition in the inspection point based on the information 140 on a traveling condition obtained during the inspection execution plan. Thereafter, the road surface condition inspection processing unit 400 updates the detailed information 120 on a road surface condition based on latest information on the road surface condition the evaluation of which is performed. Details of respective processes of the inspection necessity determination unit 410, the inspection execution plan generation unit 430, the inspection execution unit 440, the road surface condition evaluation unit 450, and the road surface condition detailed information update unit 460 are described later.

The inspection necessity determination unit 410 performs a process of determining whether or not an inspection point is included in a predetermined range in an advancing direction of the vehicle 1 with an own position as a reference, based on the detailed information 120 on a road surface condition and the information 130 on an own position that are inputted. When it is determined that an inspection point is included, inspection of the road surface condition is performed.

The inspection execution plan generation unit 430 generates an inspection execution plan of the vehicle 1 in the inspection point included in the predetermined range in the advancing direction of the vehicle 1 in a case of inspecting the road surface condition. The inspection execution plan means a travel plan including vehicle operation that is used for a purpose of performing inspection of the road surface condition and different from ordinary vehicle operation as described above. As a specific example of the travel plan, when in the operation record of the traveling safety functions included in the detailed information 120 on a road surface condition that is set in the inspection point, the operation record shows that the functions have not been operated, a higher acceleration value than an acceleration value based on the traveling record may be set as the travel plan in order to evaluate an upper speed limit of acceleration in the inspection point. Alternatively, when the record shows that the functions have been operated, a lower acceleration value than the acceleration value based on the traveling record may be set so that the functions are not operated.

When the own position is included in the inspection point, the inspection execution unit 440 executes the inspection execution plan generated in the inspection point.

The road surface condition evaluation unit 450 performs evaluation of the road surface condition in the inspection point by using the information 140 on a traveling condition obtained during the inspection execution plan. Specifically, slipperiness of the road surface may be evaluated from an average value of coefficients of friction in the inspection point estimated based on the information 140 on a traveling condition. Alternatively, an upper speed limit may be evaluated based on determination of whether or not the traveling safety function is operated in the inspection point.

The road surface condition detailed information update unit 460 performs a process of updating the detailed information 120 on a road surface condition based on the latest information on the road surface condition the evaluation of which is performed.

Figure 5:
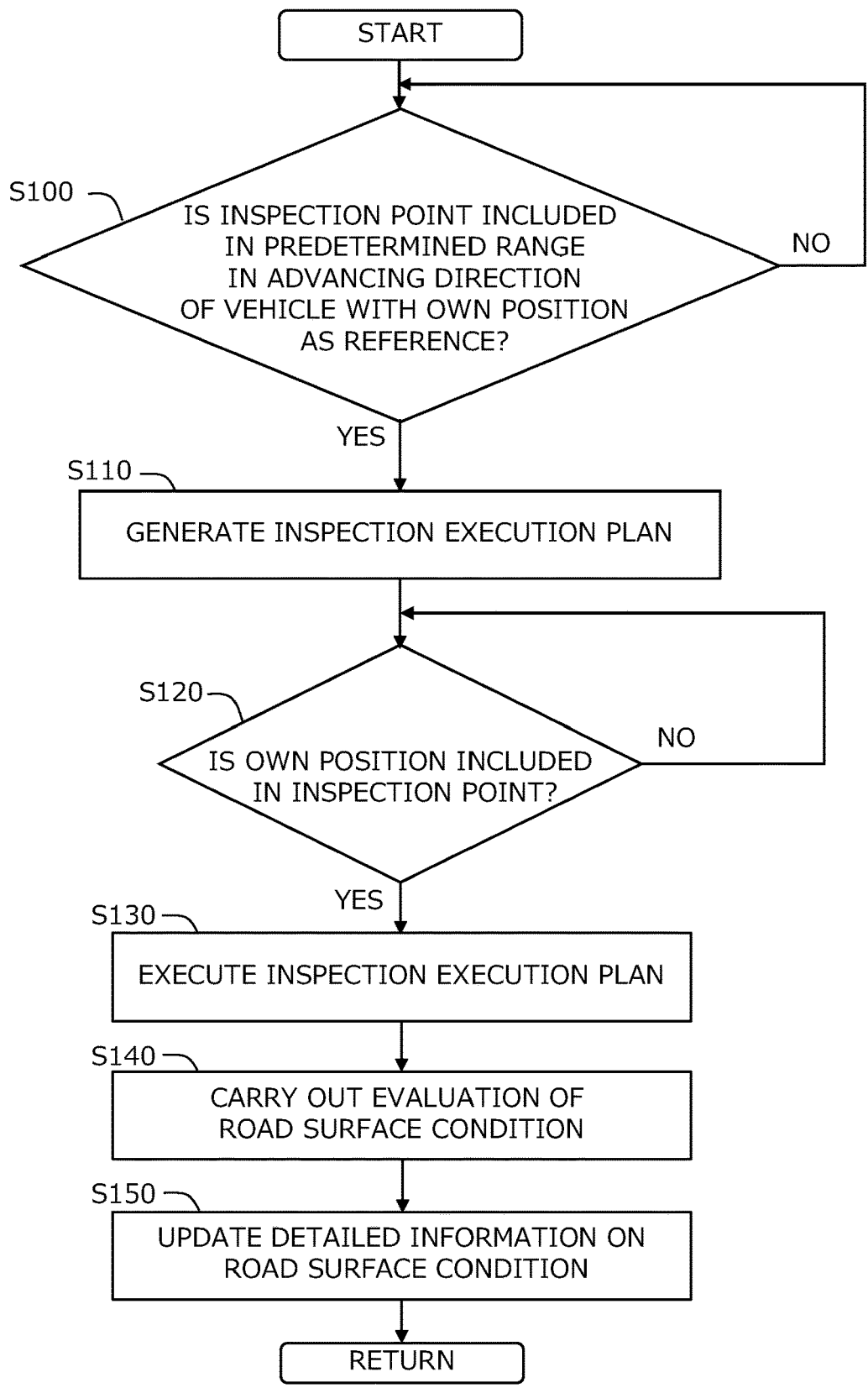
FIG. 5 is a flowchart showing a processing example of a road surface condition inspection processing unit of the road surface condition inspection device according to the first embodiment.

FIG. 5 is a flowchart showing a processing example of the road surface condition inspection processing unit 400 of the road surface condition inspection device 10.

In step S100, the road surface condition inspection processing unit 400 determines whether or not the inspection point is included in the predetermined range in the advancing direction of the vehicle 1 with the own position as the reference based on the information 130 on an own position.

When it is determined that the inspection point is included in the predetermined range in the advancing direction of the vehicle 1 with the own position as the reference (step S100; Yes), the process proceeds to step S110. Otherwise (step S100; No), the process returns to step S100.

In step S110, the road surface condition inspection processing unit 400 generates the inspection execution plan. Thereafter, the process proceeds to step S120.

In step S120, the road surface condition inspection processing unit 400 determines whether or not the information 130 on an own position is included in the inspection point.

When it is determined that the information 130 on an own position is included in the inspection point (step S120; Yes), the process proceeds to step S130. Otherwise (step S120; No), the process returns to step S120.

In step S130, the road surface condition inspection processing unit 400 executes the inspection execution plan. Thereafter, the process proceeds to step S140.

In step S140, the road surface condition inspection processing unit 400 performs evaluation of the road surface condition in the inspection point based on the information 140 on a traveling condition obtained during the inspection execution plan. Thereafter, the process proceeds to step S150.

In step S150, the road surface condition inspection processing unit 400 updates the detailed information 120 on a road surface condition based on the latest information on the road surface condition the evaluation of which is performed.

Figure 6:
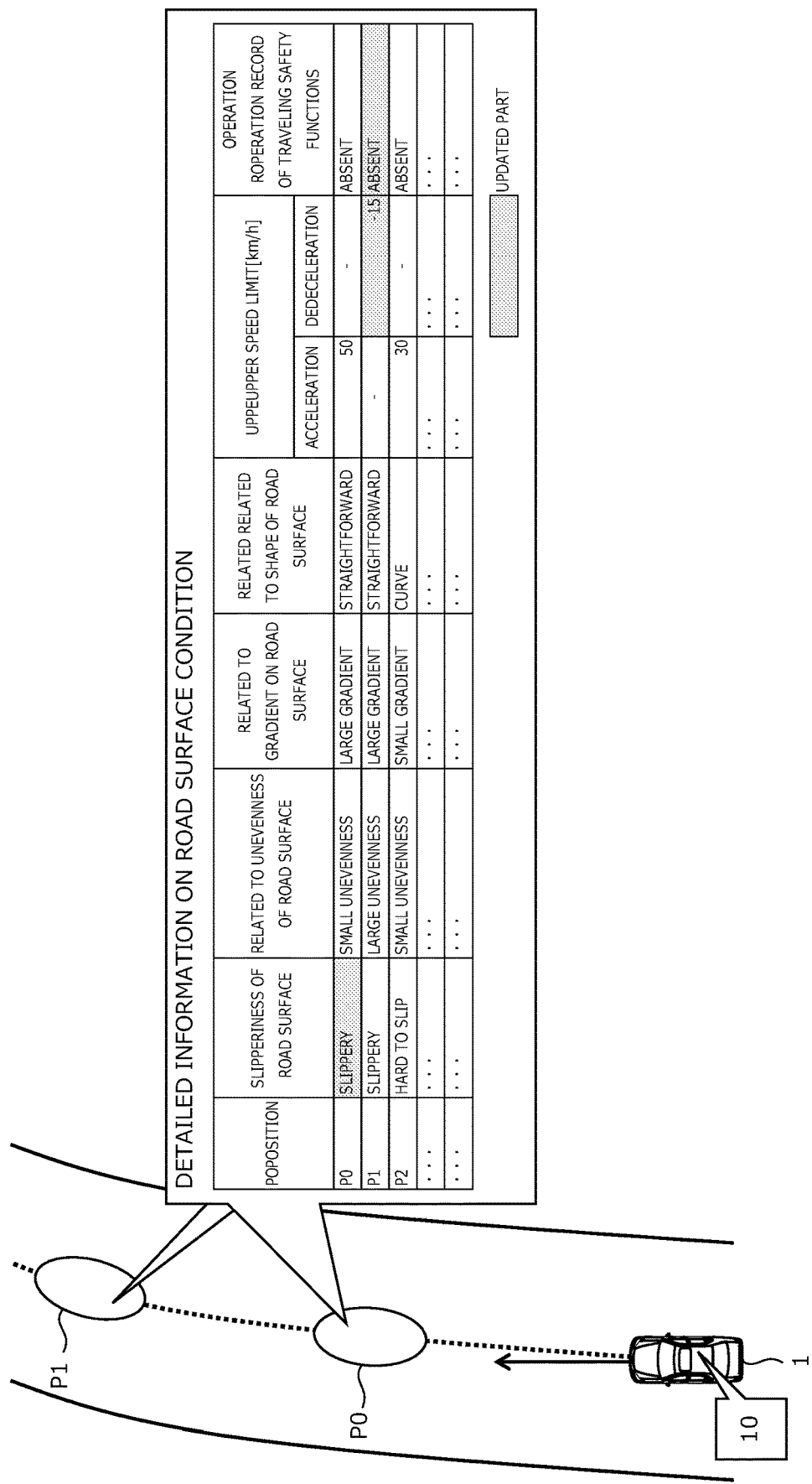
FIG. 6 is a diagram showing a processing result example of the road surface condition inspection processing unit of the road surface condition inspection device according to the first embodiment.

FIG. 6 is a diagram showing a processing result example of the road surface condition inspection processing unit 400 of the road surface condition inspection device 10 according to the first embodiment. FIG. 6 shows an example of changed parts of the detailed information 120 on a road surface condition that is updated, based on the latest information on the road surface condition.

Hereinafter, a modification of the road surface condition inspection device 10 according to the first embodiment is described.

3. Modification 1

Modification 1 is a modification of the road surface condition inspection device 10 according to the first embodiment when assuming a case in which two or more inspection points are included in a predetermined range in an advancing direction of a vehicle 1. Note that explanations that overlap with contents shown above are omitted as appropriate.

Figure 7:
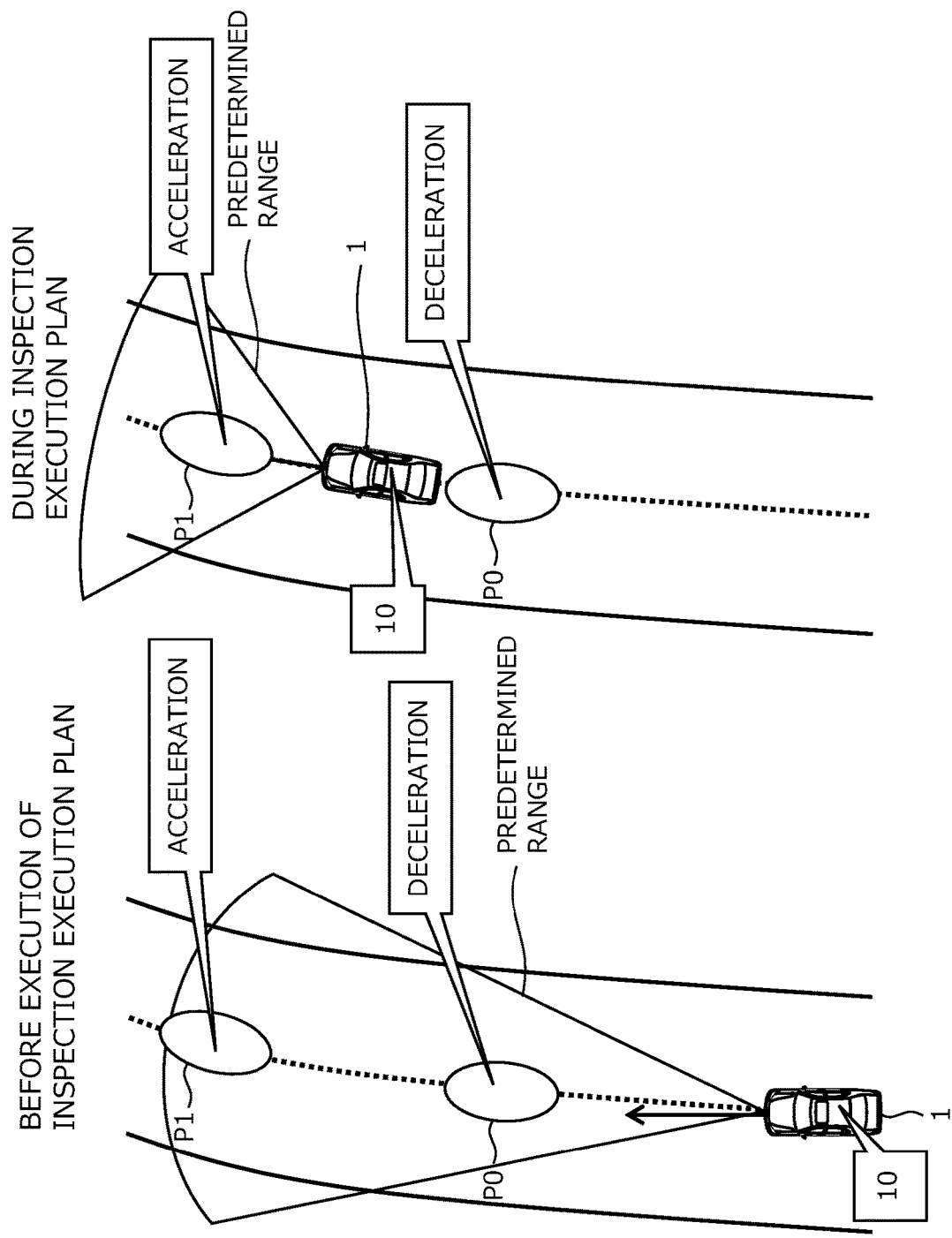
FIG. 7 is a view showing an outline of a road surface condition inspection device according to modification 1 of the first embodiment.

FIG. 7 shows an outline of the road surface condition inspection device 10 according to modification 1. When two or more inspection points are included in the predetermined range in the advancing direction of the vehicle 1, the inspection execution plan is executed for each of the inspection points. However, when an interval between an inspection point P0 and an inspection point P1 is short as shown in FIG. 7, it is assumed that a desired inspection execution plan cannot be executed in the inspection point P1 after an inspection execution plan of the inspection point P0 is executed. Specifically, a case is considered, in which an inspection execution plan of performing inspection of a road surface condition with an upper limit value of deceleration set in the inspection point P0 is executed, and subsequently, an inspection execution plan of performing inspection of the road surface condition with an upper limit value of acceleration set in the inspection point P1 is executed. At this time, when inspection of the road surface condition with the upper limit value of acceleration is performed in the inspection point P1 after inspection of the road surface condition is performed with the upper limit value of the deceleration is performed in the inspection point P0, the speed of the vehicle 1 is unlikely to reach the upper limit value of acceleration. Therefore, when two or more inspection points are included in the predetermined range in the advancing direction of the vehicle 1, a process of setting a priority order of the inspection points is performed in modification 1.

Figure 8:
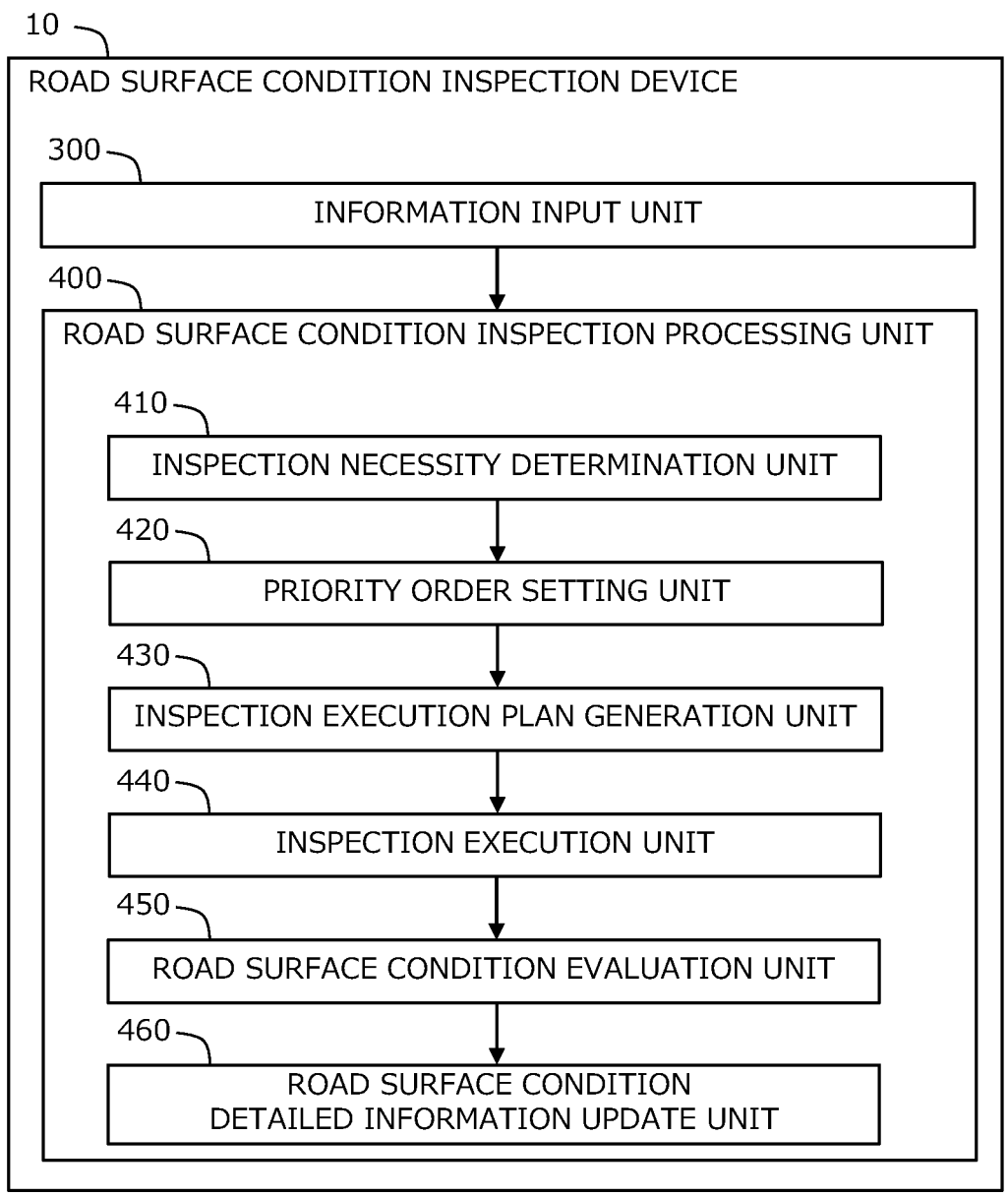
FIG. 8 is a block diagram showing a function example of the road surface condition inspection device according to modification 1 of the first embodiment.

FIG. 8 is a block diagram showing a function example of modification 1. A difference from the function example shown in FIG. 4 described above is an addition of a priority order setting unit 420. The priority order setting unit 420 performs a process of setting the priority order of the inspection points when two or more inspection points are included in the predetermined range in the advancing direction of the vehicle 1 as described above. A specific example in setting of the priority order is described in modification 1-1, and modification 1-2 shown below. Further, a modification of the inspection execution plan generation unit 430 when the priority order is set is described in modification 1-3.

3-1. Modification 1-1

Figure 9:
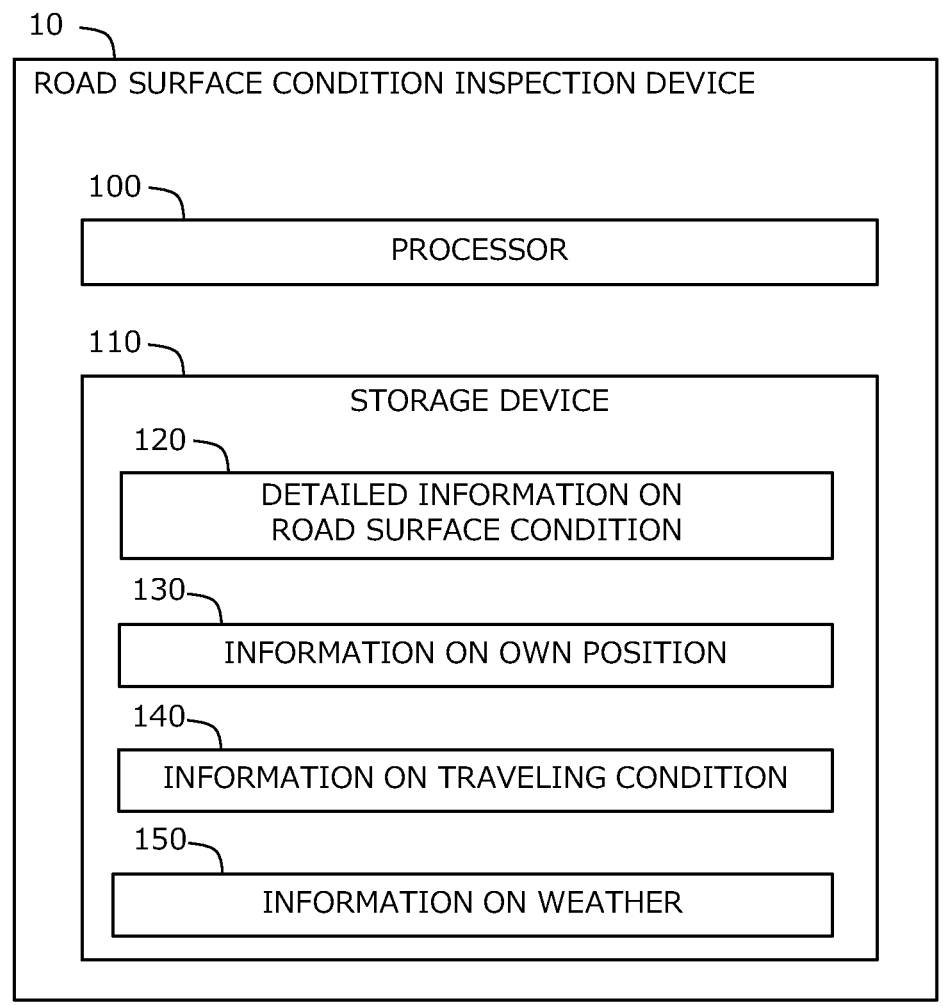
FIG. 9 is a block diagram showing a configuration example of a road surface condition inspection device according to modification 1-1 of modification 1 of the first embodiment.

A first specific example in setting of the priority order is an example of setting the priority order according to a change of a road surface condition that is predicted based on weather in the two or more inspection points included in the predetermined range in the advancing direction of the vehicle 1. FIG. 9 shows a configuration example of a road surface condition inspection device 10 according to modification 1-1 of modification 1. A storage device 110 of the road surface condition inspection device 10 according to modification 1-1 further stores data on information 150 on weather.

Figure 10:
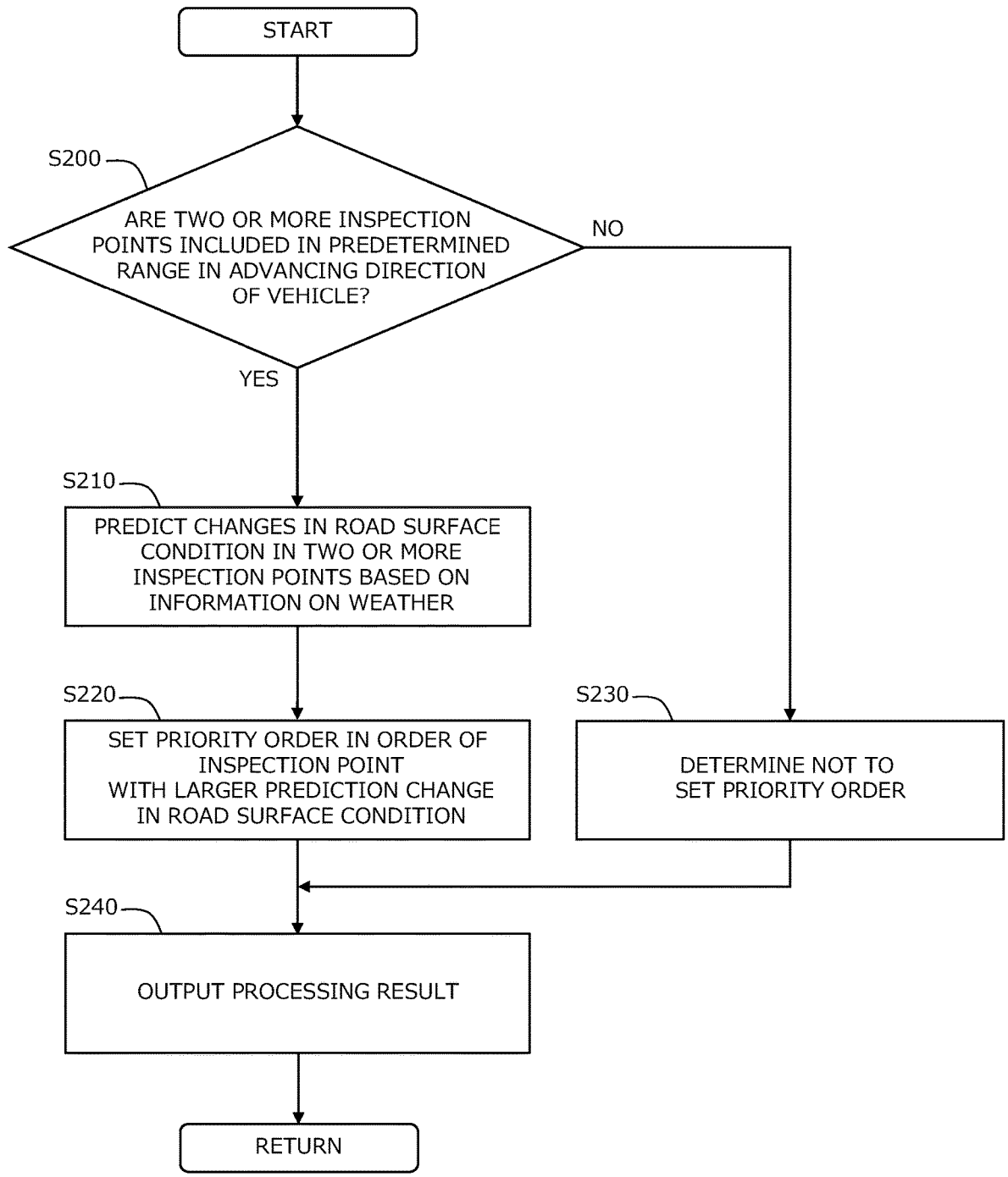
FIG. 10 is a flowchart showing a processing example of the road surface condition inspection device according to modification 1-1 of modification 1 of the first embodiment.

FIG. 10 is a flowchart showing a processing example of a priority order setting unit 420 in a road surface condition inspection processing unit 400 of the road surface condition inspection device 10 according to modification 1-1 of modification 1.

In step S200, the priority order setting unit 420 determines whether or not two or more inspection points are included in the predetermined range in the advancing direction of the vehicle 1.

When it is determined that two or more inspection points are included in the predetermined range in the advancing direction of the vehicle 1 (step S200; Yes), a process proceeds to step S210. Otherwise (step S200; No), the process proceeds to step S230.

In step S210, the priority order setting unit 420 predicts change in the road surface conditions in the two or more inspection points based on the information 150 on weather. Thereafter, the process proceeds to step S220. As a prediction method, when the weather is rainy, for example, an inspection point in which a gradient of a road surface is the largest in the information related to the gradient of the road surface included in the detailed information 120 on a road surface condition may be predicted as an inspection point in which change in the road surface condition is the largest.

In step S220, the priority order setting unit 420 sets a higher priority order to an inspection point with a larger prediction change in the road surface condition. Thereafter, the process proceeds to step S240.

In step S230, the priority order setting unit 420 selects not to set the priority order. Thereafter, the process proceeds to step S240.

In step S240, the priority order setting unit 420 outputs a processing result.

3-2. Modification 1-2

Figure 11:
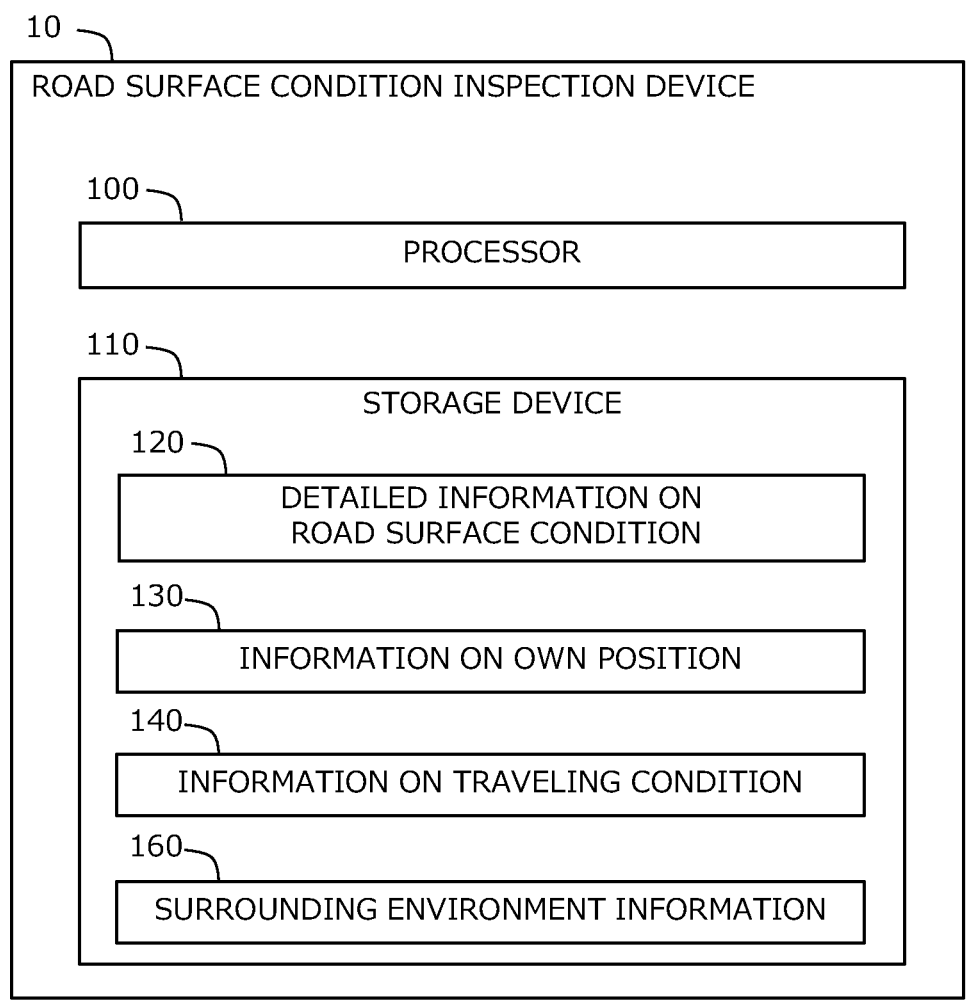
FIG. 11 is a block diagram showing a configuration example of a road surface condition inspection device according to modification 1-2 of modification 1 of the first embodiment.

A second specific example in setting of a priority order is an example of setting the priority order by predicting a change in a road surface condition based on a surrounding environment where a vehicle 1 travels. FIG. 11 shows a configuration example of a road surface condition inspection device 10 according to modification 1-2 of modification 1. The storage device 110 of the road surface condition inspection device 10 according to modification 1-2 further stores data on surrounding environment information 160. The surrounding environment information 160 includes at least one piece of information on a camera image obtained from a sensor (for example, a camera, a LIDAR or the like) mounted on the vehicle 1 and information on a three-dimensional point group, information on weather estimated based on the information on the three-dimensional point group and infrastructure information obtained from an infrastructure environment sensor (for example, an infrastructure camera or the like) installed in a vicinity of a road surface.

Figure 12:
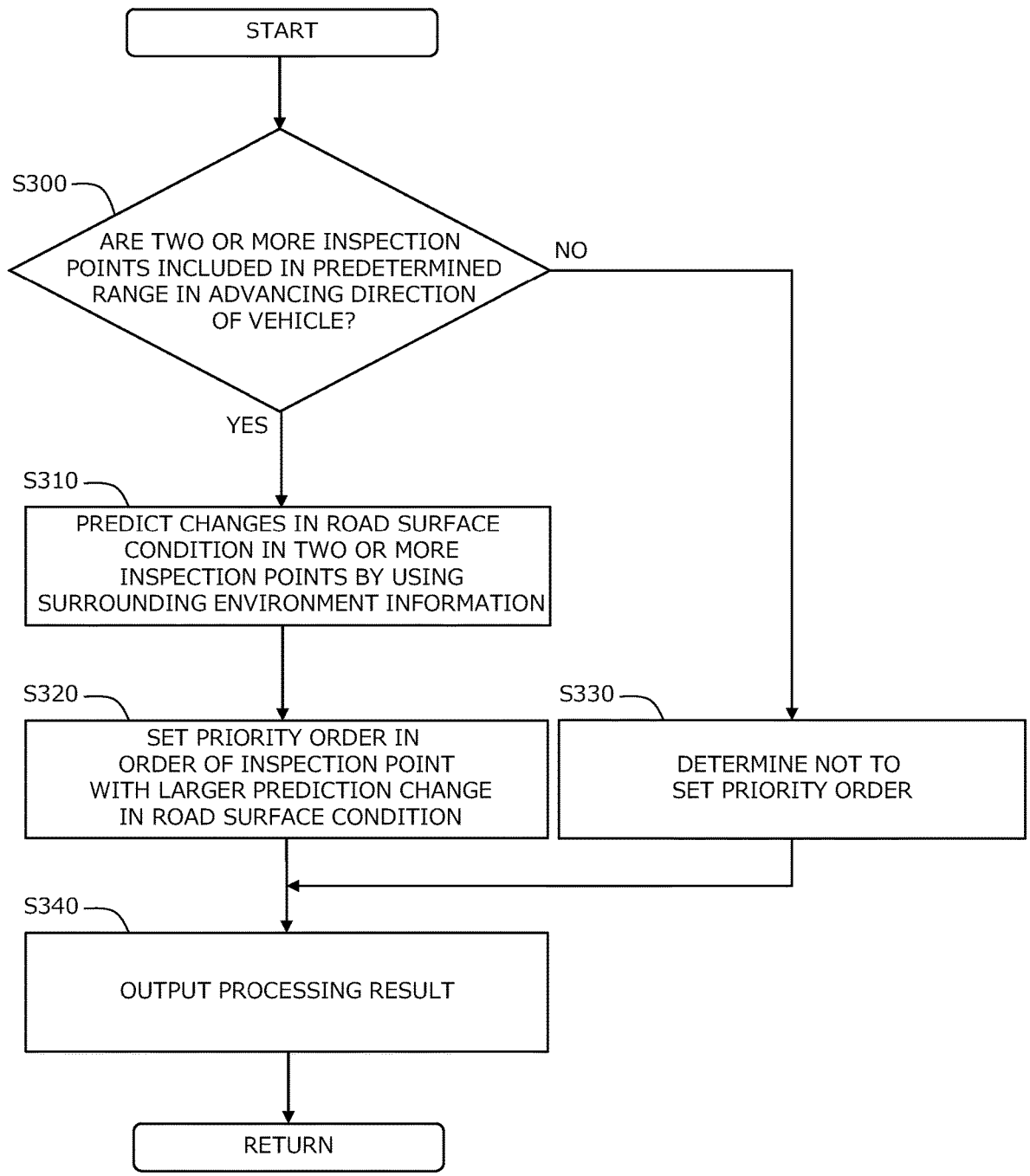
FIG. 12 is a flowchart showing a processing example of the road surface condition inspection device according to modification 1-2 of modification 1 of the first embodiment.

FIG. 12 is a flowchart showing a processing example of a priority order setting unit 420 in a road surface condition inspection processing unit 400 of the road surface condition inspection device 10 according to modification 1-2 of modification 1.

In step S300, the priority order setting unit 420 determines whether or not two or more inspection points are included in a predetermined range in an advancing direction of the vehicle 1.

When it is determined that two or more inspection points are included in the predetermined range in the advancing direction of the vehicle 1 (step S300; Yes), a process proceeds to step S310. Otherwise (step S300; No), the process proceeds to step S330.

In step S310, the priority order setting unit 420 predicts changes in the road surface conditions in the two or more inspection points by using the surrounding environment information 160. Thereafter, the process proceeds to step S320. As a prediction method, an inspection point with a largest unevenness change of the road surface may be predicted as the inspection point with the largest change in the road surface condition by using machine learning such as Deep Learning, for example.

In step S320, the priority order setting unit 420 sets a higher priority order to an inspection point with a larger prediction change of the road surface condition. Thereafter, the process proceeds to step S340.

In step S330, the priority order setting unit 420 chooses not to set the priority order. Thereafter, the process proceeds to step S340.

In step S340, the priority order setting unit 420 outputs a processing result.

3-3. Modification 1-3

Figure 13:
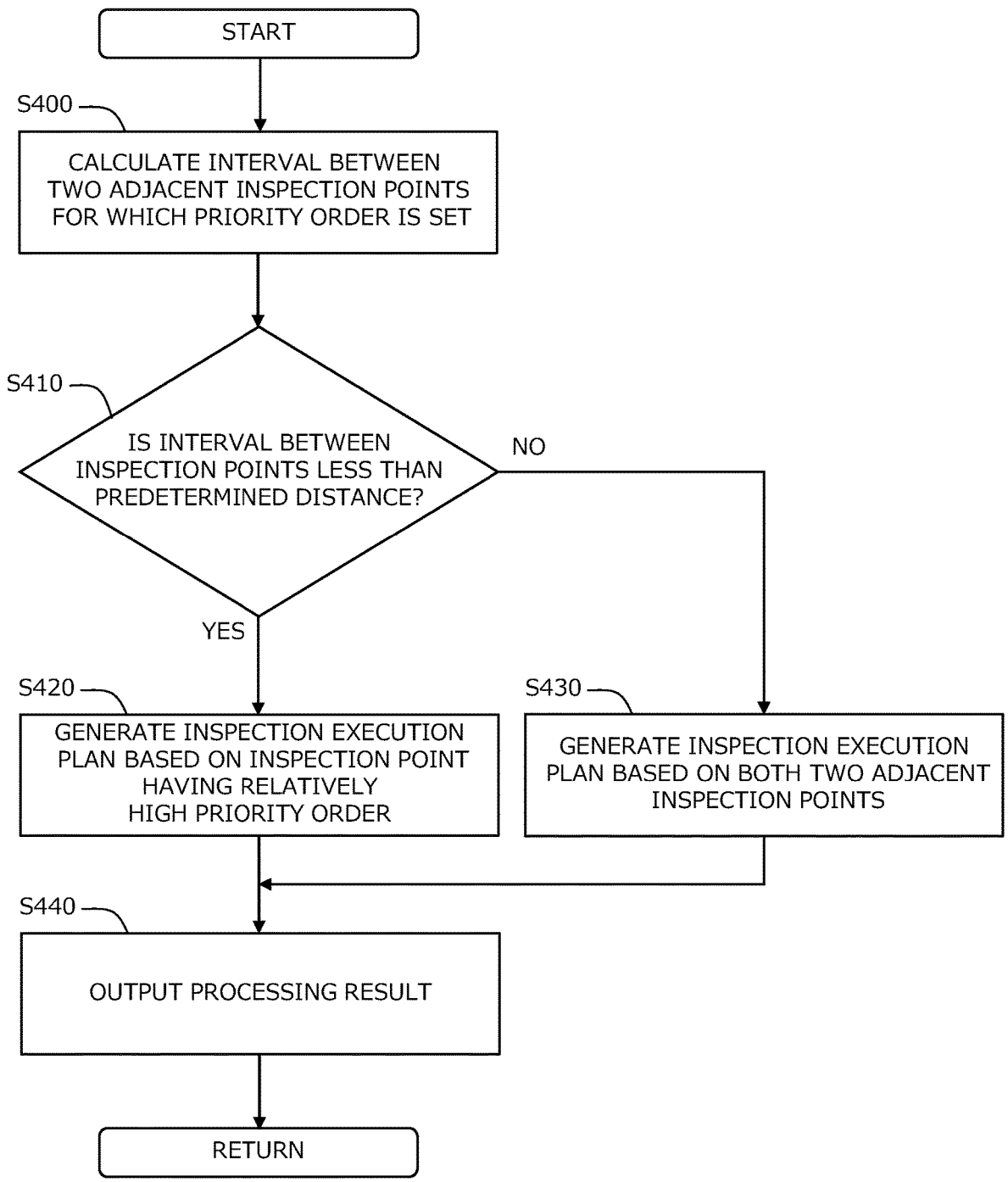
FIG. 13 is a flowchart showing a processing example of a road surface condition inspection device according to modification 1-3 of modification 1 of the first embodiment.

Modification 1-3 is a modification of the inspection execution plan generation unit 430 in modification 1. In an inspection execution plan generation unit 430 in modification 1-3, an inspection execution plan is generated based on an interval between two adjacent inspection points, when a priority order is set for two or more inspection points included in a predetermined range. A specific example is described with a flowchart showing a processing example of the inspection execution plan generation unit 430 of a road surface condition inspection processing unit 400 in a road surface condition inspection device 10 according to modification 1-3 of modification 1 shown in FIG. 13.

In step S400, the inspection execution plan generation unit 430 calculates the interval between the two adjacent inspection points to which the priority order is set. Thereafter, a process proceeds to step S410.

In step S410, the inspection execution plan generation unit 430 performs determination of whether or not the interval between the inspection points is less than a predetermined distance.

When it is determined that the interval between the inspection points is less than the predetermined distance (step S410; Yes), the process proceeds to step S420. Otherwise (step S410; No), the process proceeds to step S430.

In step S420, the inspection execution plan generation unit 430 generates an inspection execution plan based on an inspection point having a relatively high priority order. Thereafter, the process proceeds to step S440.

In step S430, the inspection execution plan generation unit 430 generates an inspection execution plan based on both the two adjacent inspection points. Thereafter, the process proceeds to step S440.

In step S440, the inspection execution plan generation unit 430 outputs a processing result.

4. Modification 2

Modification 2 is a modification showing an exception of the road surface condition inspection device 10 according to the first embodiment when performing no inspection. A part different from the first embodiment shown in the above is an inspection necessity determination unit 410. Note that explanations that overlap with contents shown in the above are omitted as appropriate.

Figure 14:
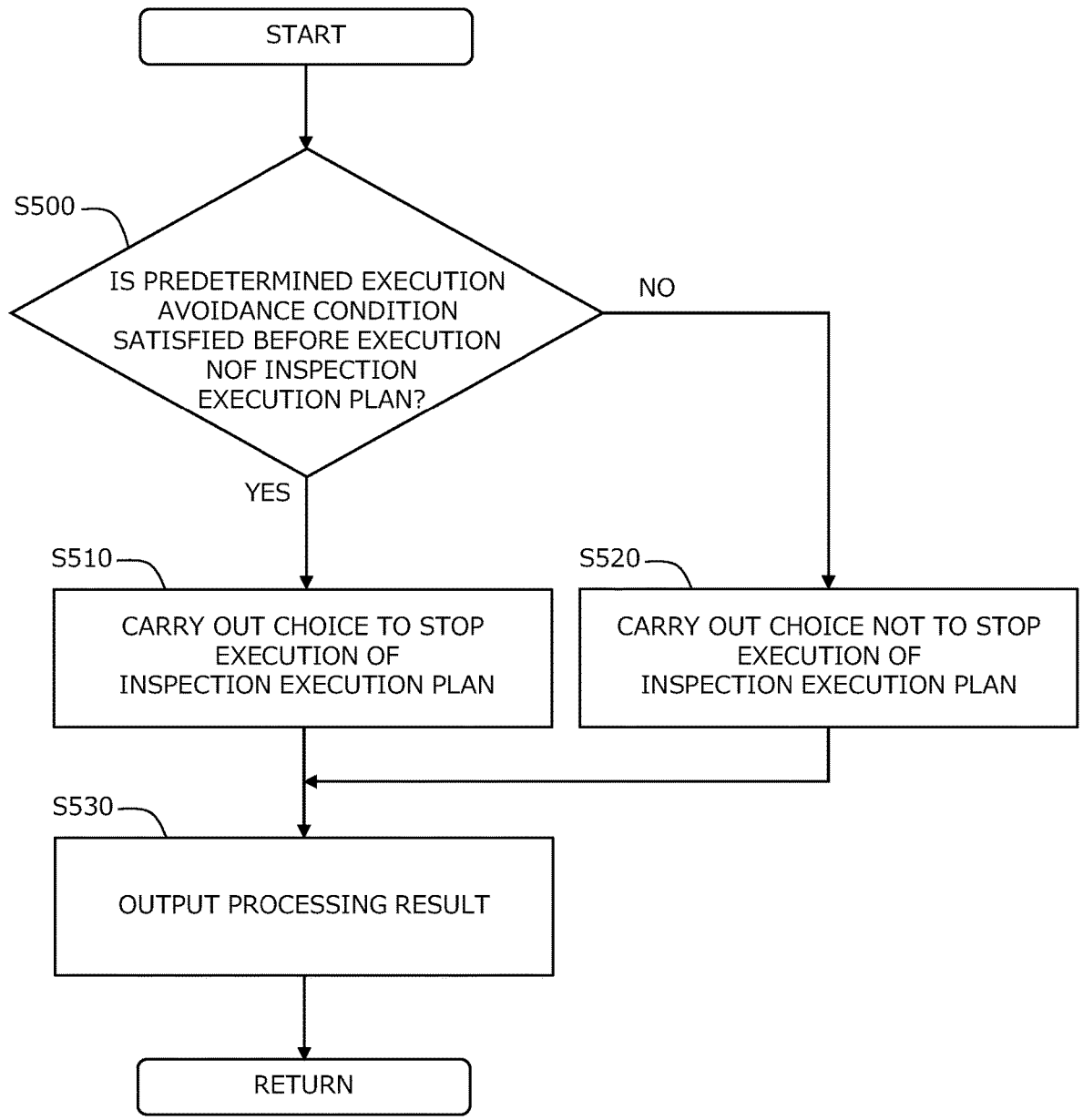
FIG. 14 is a flowchart showing a processing example of a road surface condition inspection device according to modification 2 of the first embodiment.

FIG. 14 is a flowchart showing a processing example of the inspection necessity determination unit 410 in a road surface condition inspection processing unit 400 of a road surface condition inspection device 10 according to modification 2 of the first embodiment.

In step S500, the inspection necessity determination unit 410 determines whether or not a predetermined execution avoidance condition is satisfied before execution of an inspection execution plan.

When it is determined that the predetermined execution avoidance condition is satisfied (step S500; Yes), a process proceeds to step S510. Otherwise (step S500; No), the process proceeds to step S520.

In step S510, the inspection necessity determination unit 410 chooses to stop execution of the inspection execution plan. Thereafter, the process proceeds to step S530.

In step S520, the inspection necessity determination unit 410 chooses not to stop execution of the inspection execution plan. Thereafter, the process proceeds to step S530.

In step S530, the inspection necessity determination unit 410 outputs a processing result.

The predetermined execution avoidance condition includes at least one of a fact that an occupant is recognized in an interior of the vehicle 1, and a fact that an object (including a moving object and a stationary object) in a predetermined area. Two specific examples that are the predetermined execution avoidance conditions are explained in modification 2-1 and modification 2-2 shown below.

4-1. Modification 2-1

Figure 15:
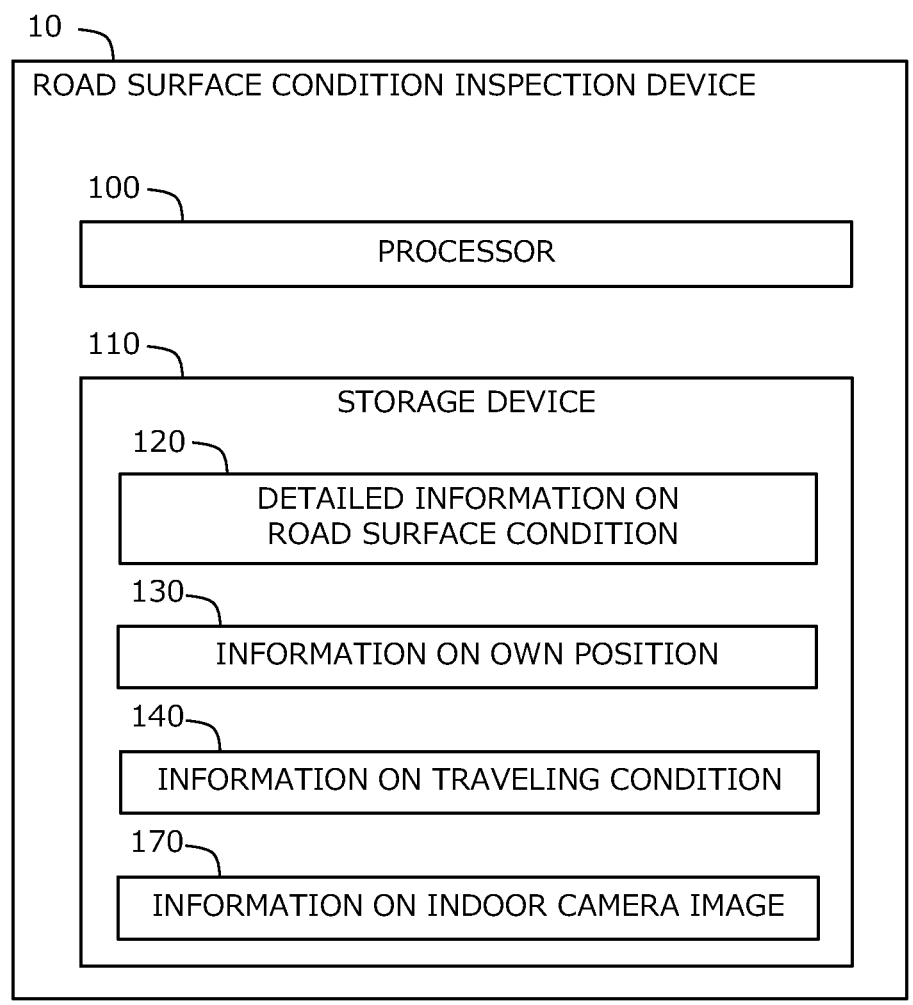
FIG. 15 is a block diagram showing a configuration example of a road surface condition inspection device according to modification 2-1 of modification 2 of the first embodiment.

A first specific example showing the predetermined execution avoidance condition is that an occupant is recognized in an interior of the vehicle 1. Since a travel plan that is a vehicle operation for the purpose of inspection is set in the inspection execution plan, there is a possibility of giving a discomfort to the occupant during the inspection execution plan. Therefore, as one of the predetermined execution avoidance conditions, the fact that an occupant is recognized in the interior of the vehicle 1 is included. FIG. 15 shows a block diagram of a configuration example of a road surface condition inspection device 10 according to modification 2-1 of modification 2. A storage device 110 of the road surface condition inspection device 10 according to modification 2-1 of modification 2 further stores data on information 170 on an indoor camera image obtained by capturing an indoor by using an indoor camera mounted on the vehicle 1.

Figure 16:
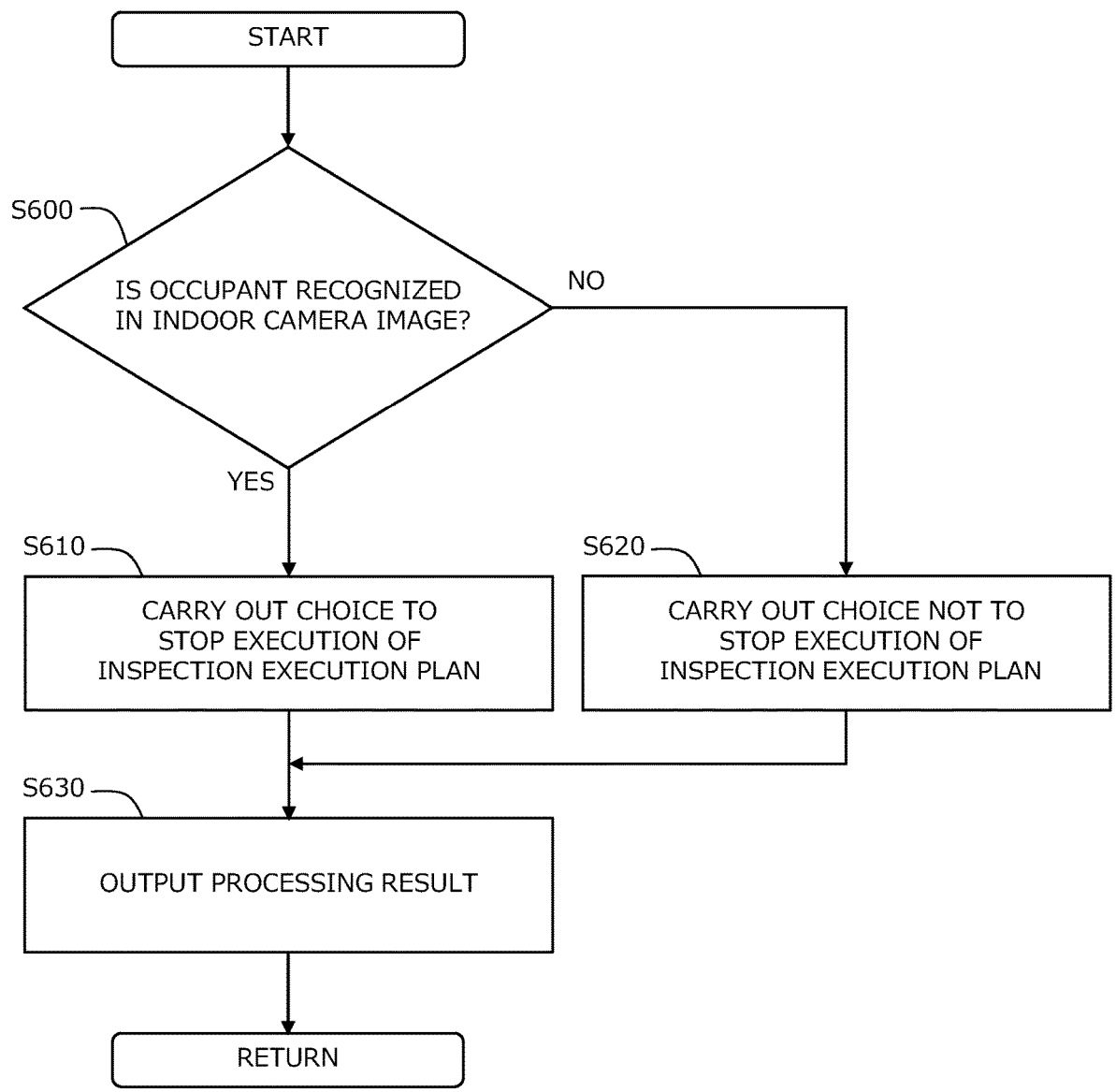
FIG. 16 is a flowchart showing a processing example of the road surface condition inspection device according to modification 2-1 of modification 2 of the first embodiment.

FIG. 16 is a flowchart showing a processing example of an inspection necessity determination unit 410 of a road surface condition inspection processing unit 400 in the road surface condition inspection device 10 according to modification 2-1 of modification 2.

In step S600, the inspection necessity determination unit 410 determines whether or not an occupant is recognize based on the information 170 on the indoor camera image.

When it is determined that the occupant is recognized (step S600; Yes), a process proceeds to step S610. Otherwise (step S600; No), the process proceeds to step S620.

In step S610, the inspection necessity determination unit 410 carries out a choice of stop of execution of the inspection execution plan. Thereafter, the process proceeds to step S630.

In step S620, the inspection necessity determination unit 410 carries out the choice of not stopping execution of the inspection execution plan. Thereafter, the process proceeds to step S630.

In step S630, the inspection necessity determination unit 410 outputs a processing result.

4-2. Modification 2-2

Figure 17:
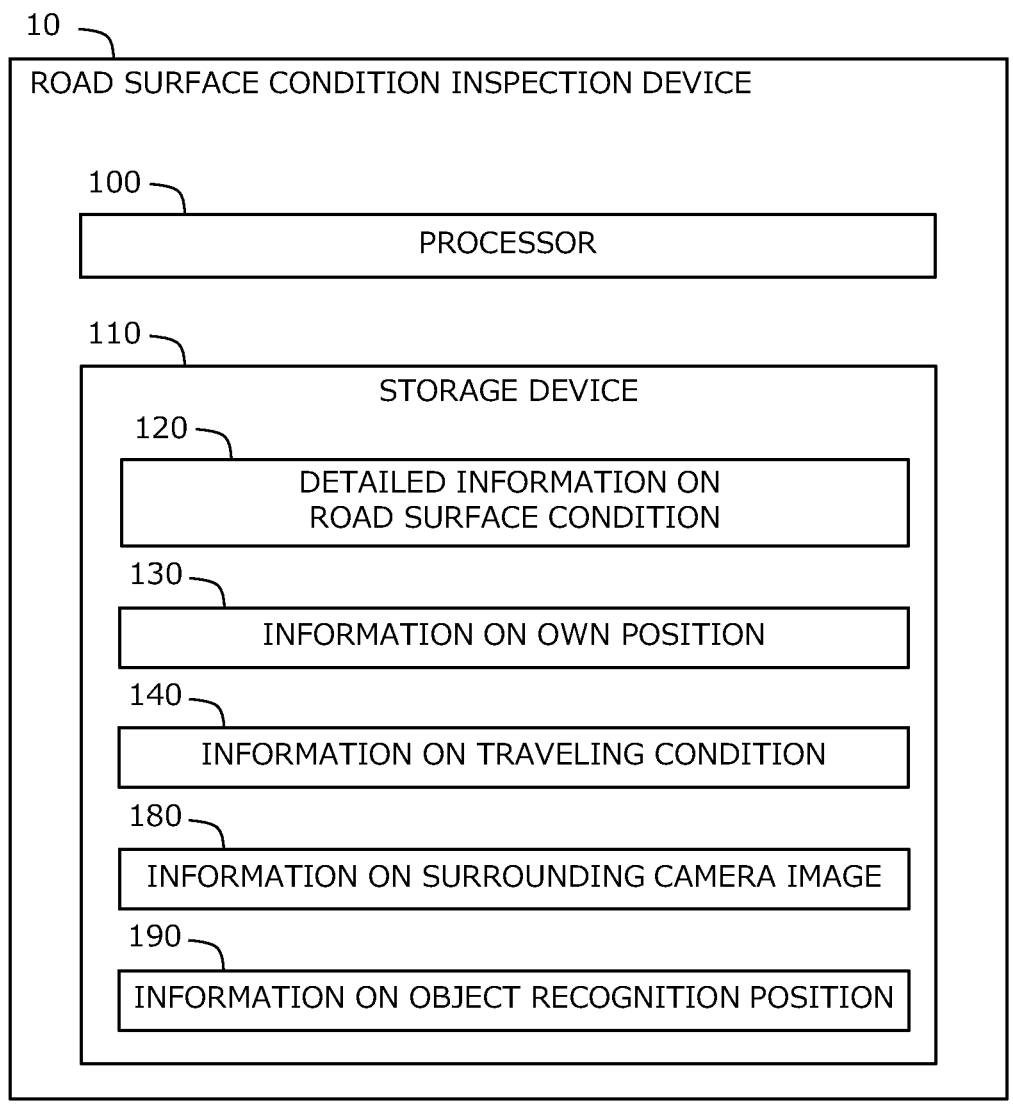
FIG. 17 is a block diagram showing a configuration example of a road surface condition inspection device according to modification 2-2 of modification 2 of the first embodiment.

A second specific example showing the predetermined execution avoidance condition is the fact that an object is recognized in a predetermined area with the own position of the vehicle 1 as the reference. For example, when the inspection execution plan that performs rapid deceleration in the inspection point is executed, it is assumed to collide with a following vehicle when a distance from a following vehicle is short. Therefore, the fact that an object is recognized in a predetermined area with the own position of the vehicle 1 as the reference is included as one of the predetermined execution avoidance conditions. FIG. 17 shows a block diagram of a configuration example of a road surface condition inspection device 10 according to modification 2-2 of modification 2. A storage device 110 of the road surface condition inspection device 10 according to modification 2-2 of modification 2 further stores data on information 180 on a surrounding camera image, and data on information 190 on an object recognition position.

The information 180 on the surrounding camera image includes information on a camera image obtained by capturing a surrounding of a vehicle 1 by using a camera mounted on the vehicle 1. The information 190 on the object recognition position includes information on a position where an object is recognized based on at least one of the information 180 on a surrounding camera image and a recognition sensor mounted on the vehicle 1. As the recognition sensor, there are illustrated LIDAR (Laser Imaging Detection and Ranging), RADAR (Radio Detection and Ranging) and the like. As a method for recognizing the position of the object by using the information 180 on the surrounding camera image, performing distance measurement by using a stereo camera having two surrounding cameras and the like are illustrated.

Figure 18:
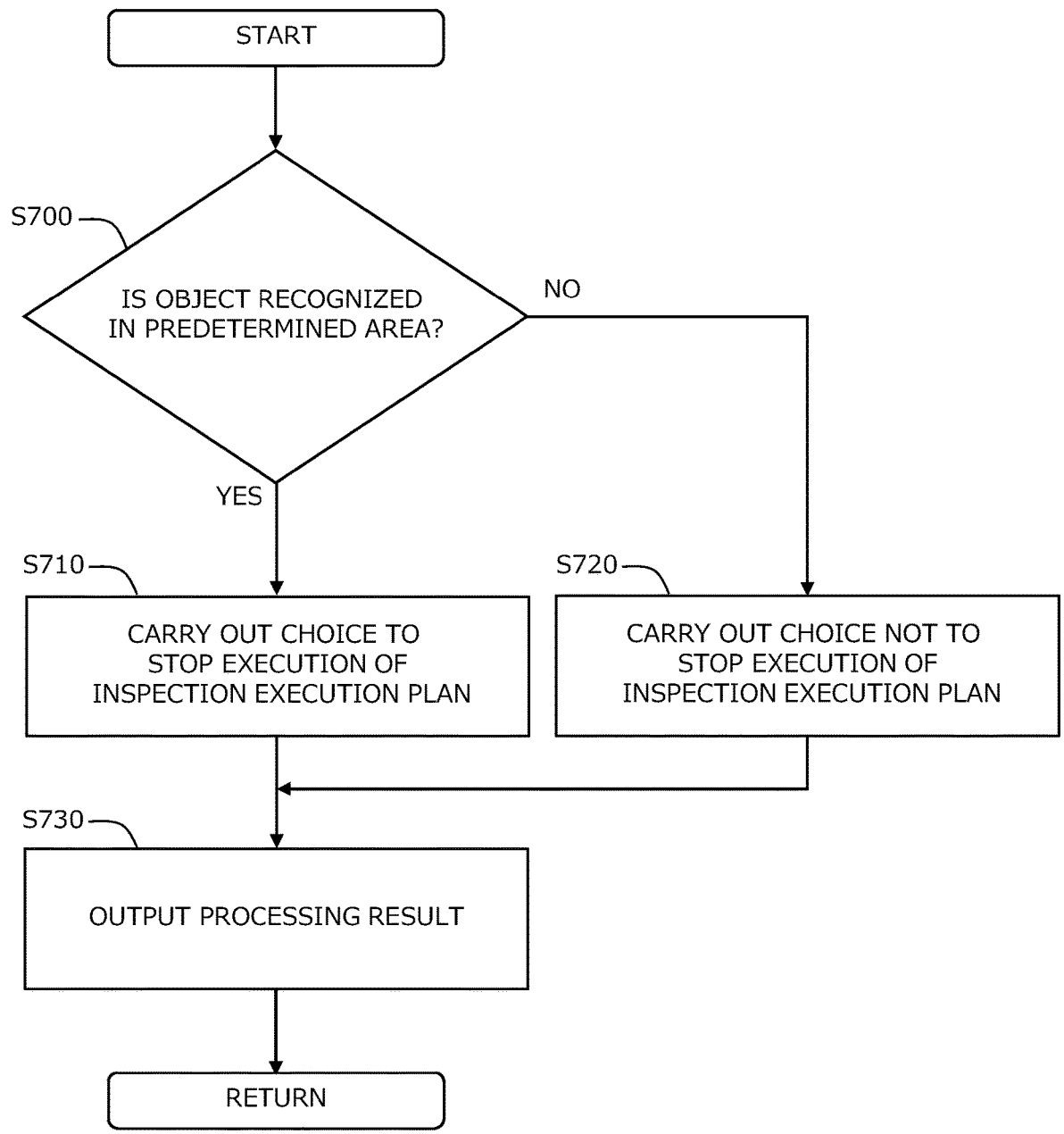
FIG. 18 is a flowchart showing a processing example of the road surface condition inspection device according to modification 2-2 of modification 2 of the first embodiment.

FIG. 18 is a flowchart showing a processing example of an inspection necessity determination unit 410 of a road surface condition inspection processing unit 400 in the road surface condition inspection device 10 according to modification 2-2 of modification 2.

In step S700, the inspection necessity determination unit 410 determines whether or not the object is recognized in the predetermined area.

When it is determined that the object is recognized in the predetermined area (step S700; Yes), a process proceeds to step S710. Otherwise (step S700; No), the process proceeds to step S720.

In step S710, the inspection necessity determination unit 410 chooses to stop execution of the inspection execution plan. Thereafter, the process proceeds to step S730.

In step S720, the inspection necessity determination unit 410 chooses not to stop execution of the inspection execution plan. Thereafter, the process proceeds to step S730.

In step S730, the inspection necessity determination unit 410 outputs a processing result.

Figure 19:
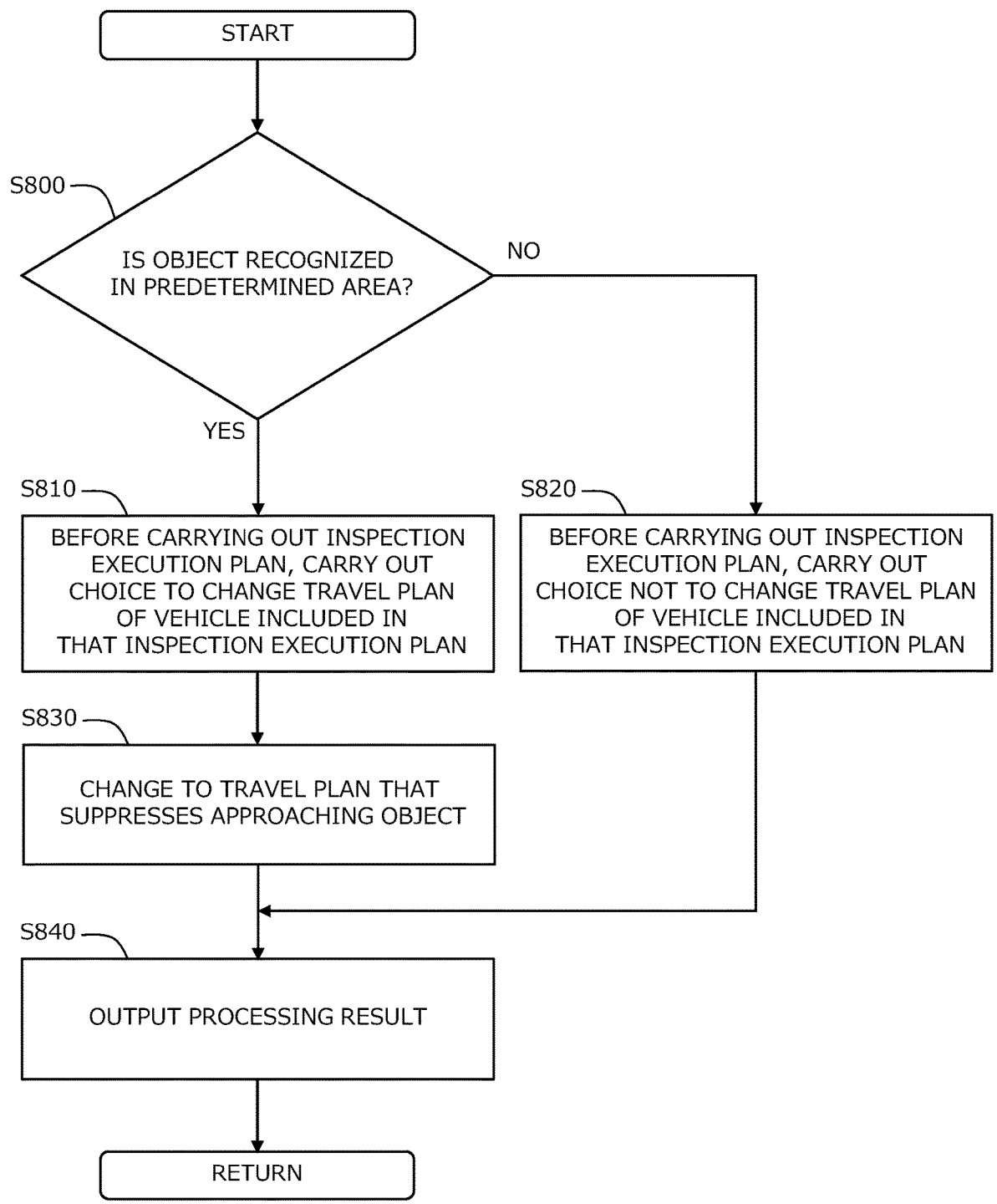
FIG. 19 is a flowchart showing the processing example of the road surface condition inspection device according to modification 2-2 of modification 2 of the first embodiment.

In the above, it is stated that execution of the inspection execution plan is stopped when an object is recognized in the predetermined area with the own position of the vehicle 1 as the reference. However, even when an object is recognized in the predetermined area, a travel plan of the vehicle 1 included in the inspection execution plan may be changed to a travel plan that suppresses approaching an object, before execution of the inspection execution plan. FIG. 19 shows a flowchart as a processing example of the inspection necessity determination unit 410 in this case.

In step S800, the inspection necessity determination unit 410 determines whether or not an object is recognized in a predetermined area.

When it is determined that an object is recognized in the predetermined area (step S800; Yes), a process proceeds to step S810. Otherwise (step S800; No), the process proceeds to step S820.

In step S810, the inspection necessity determination unit 410 chooses to change the traveling plan of the vehicle 1 included in the inspection execution plan, before execution of the inspection execution plan. Thereafter, the process proceeds to step S830.

In step S820, the inspection necessity determination unit 410 chooses not to change the travel plan of the vehicle 1 included in the inspection execution plan, before execution of the inspection execution plan. Thereafter, the process proceeds to step S840.

In step S830, the inspection necessity determination unit 410 changes the travel plan to the travel plan that suppresses approaching the object. Thereafter, the process proceeds to step S840.

In step S840, the inspection necessity determination unit 410 outputs a processing result.

Figure 20:
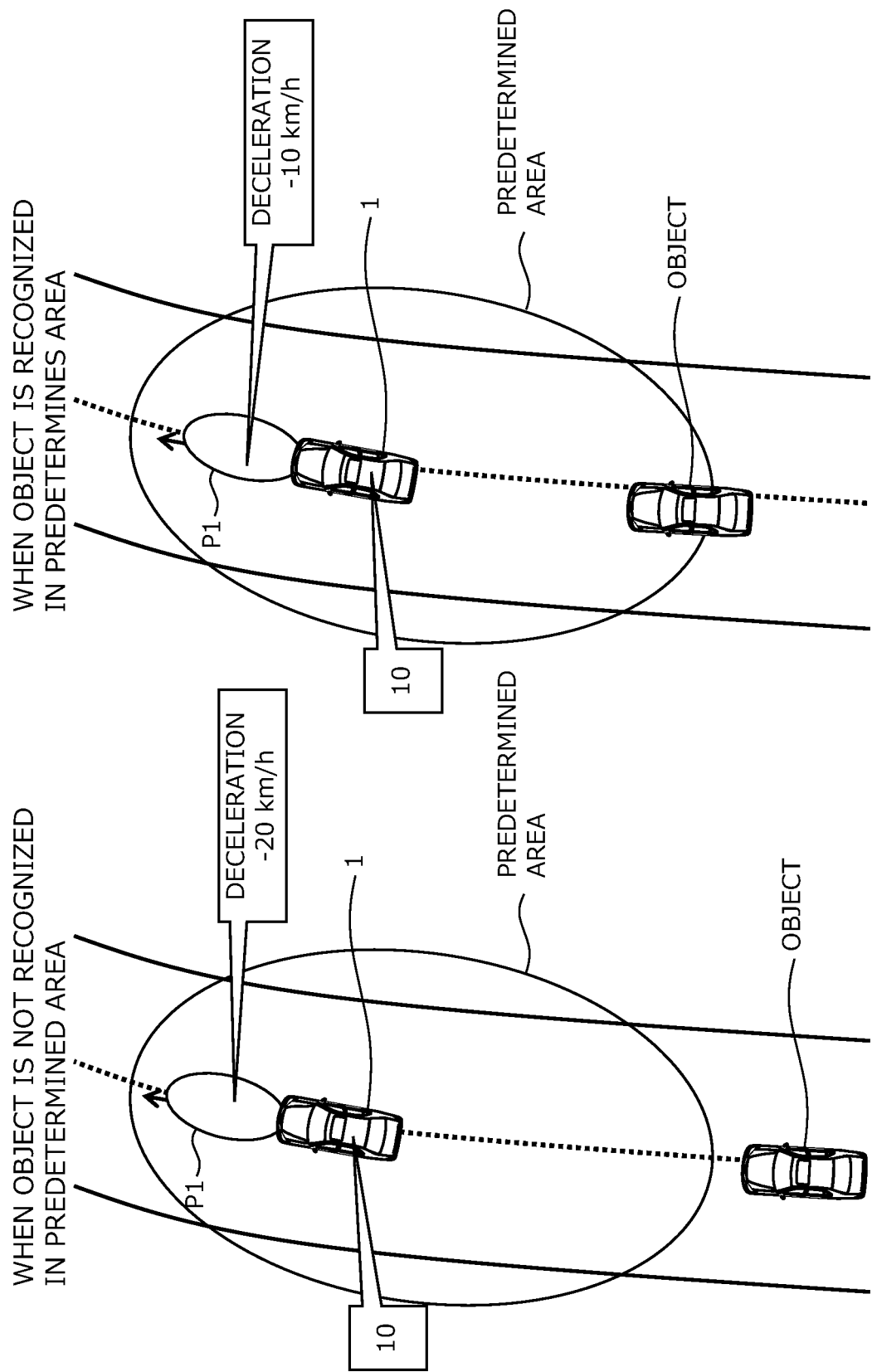
FIG. 20 is a view showing a processing result example of the road surface condition inspection device according to modification 2-2 of modification 2 of the first embodiment.

A processing result example is shown in FIG. 20. According to FIG. 20, a setting for deceleration is made in the travel plan of the vehicle 1 that is included in the inspection execution plan. At this time, in the case of an object being recognized behind the vehicle 1, in the predetermined area, the setting is changed to a deceleration value lower than a deceleration value set in the travel plan. Thereafter, based on the changed travel plan, the inspection execution plan is executed.

5. Modification 3

Modification 3 is a different modification from modification 2 that shows an exception of the road surface condition inspection device 10 according to the first embodiment when inspection is not performed. Specifically, modification 3 is a modification in which generation of the inspection execution plan, which is a subsequent process, is not performed, when the execution avoidance conditions shown in modification 2 are not satisfied, that is, when it is determined to perform inspection in the inspection necessity determination unit 410. A part different from the first embodiment shown in the above is an inspection execution plan generation unit 430. Note that explanations that overlap with contents shown in the above are omitted as appropriate.

Figure 21:
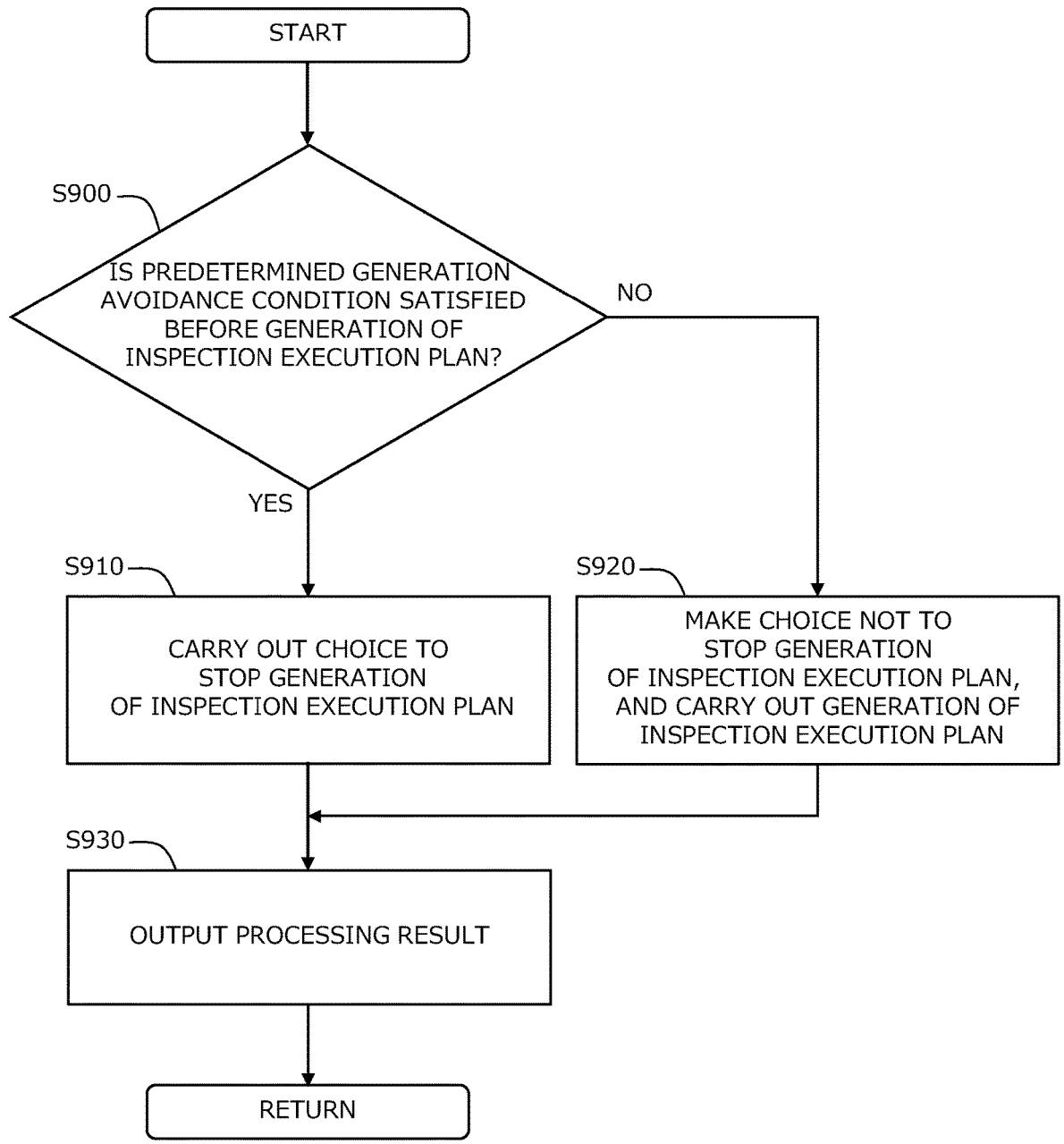
FIG. 21 is a flowchart showing a processing example of a road surface condition inspection device according to modification 3 of the first embodiment.

FIG. 21 is a flowchart showing a processing example of the inspection execution plan generation unit 430 in a road surface condition inspection processing unit 400 of a road surface condition inspection device 10 according to modification 3 of the first embodiment.

In step S900, the inspection execution plan generation unit 430 determines whether or not a predetermined generation avoidance condition is satisfied before generation of the inspection execution plan. The predetermined generation avoidance condition includes a fact that a speed included in a vehicle operation used for a purpose of performing inspection of a road surface condition is lower than a predetermined speed and a constant speed.

When it is determined that the predetermined generation avoidance condition is satisfied (step S900; Yes), a process proceeds to step S910. Otherwise (step S900; No), the process proceeds to step S920.

In step S910, the inspection execution plan generation unit 430 makes a choice to stop generation of the inspection execution plan. Thereafter, the process proceeds to step S930. When two or more inspection points are included in a predetermined range in an advancing direction of a vehicle 1 in this step, a choice to stop generation of the inspection execution plan is made for only the corresponding inspection point, and the inspection execution plan is generated based on the inspection point except for the corresponding inspection point.

In step S920, the inspection execution plan generation unit 430 makes a choice not to stop generation of the inspection execution plan and generates the inspection execution plan. Thereafter, the process proceeds to step S930.

In step S930, the inspection execution plan generation unit 430 outputs a processing result.

6. Modification 4

When abnormality of the vehicle 1 is detected during the inspection execution plan in the inspection execution unit 440, it is assumed that the traveling condition of the vehicle 1 that is obtained is not appropriate. If the detailed information 120 on a road surface condition is updated in this state, the vehicle 1 is likely to travel based on the detailed information 120 on a road surface condition that is not appropriate when the vehicle 1 travels normally based on the detailed information 120 on a road surface condition. Accordingly, modification 4 prevents updating the detailed information 120 on a road surface condition that is set for the inspection point when abnormality of the vehicle 1 is detected, as a modification of the road surface condition inspection device 10 according to the first embodiment. A part different from the first embodiment shown in the above is a road surface condition evaluation unit 450. Note that explanations that overlap with the contents shown in the above are omitted as appropriate.

Figure 22:
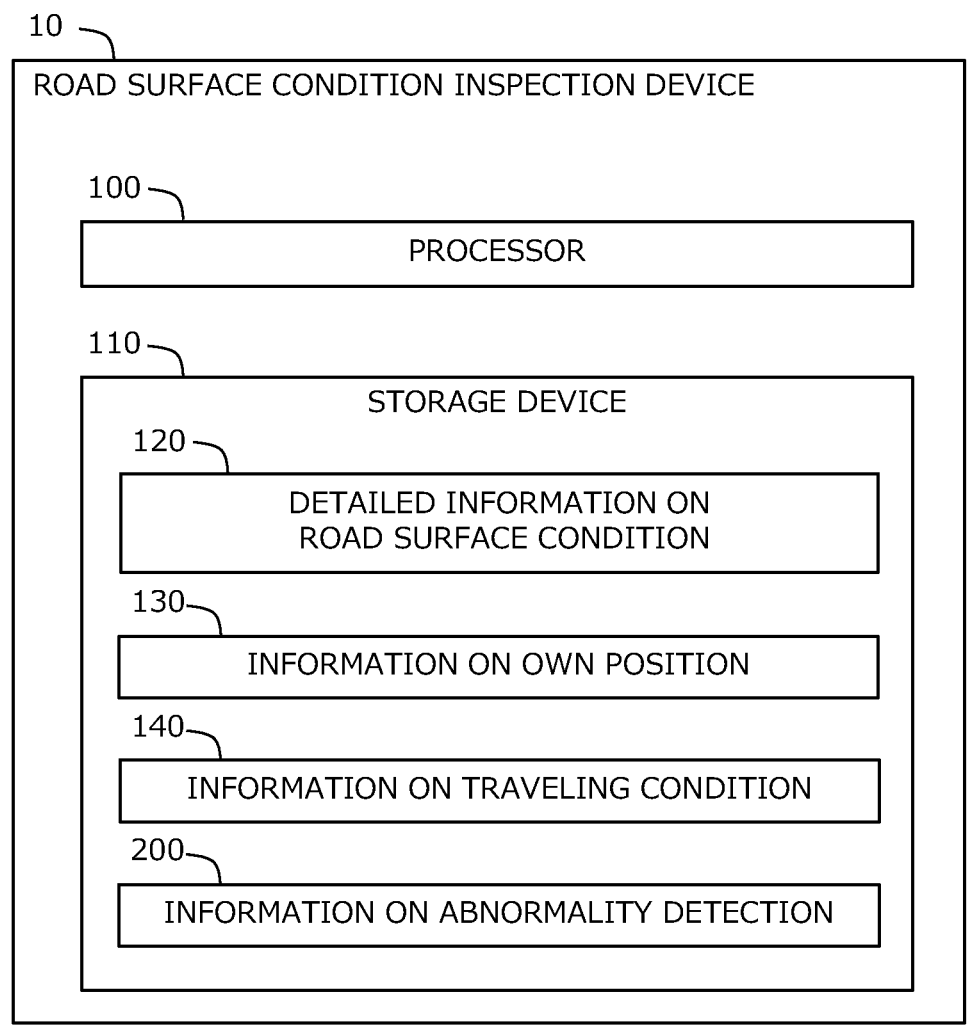
FIG. 22 is a block diagram showing a configuration example of a road surface condition inspection device according to modification 4 of the first embodiment.

FIG. 22 is a block diagram showing a configuration example of a road surface condition inspection device 10 according to modification 4 of the first embodiment. A storage device 110 of the road surface condition inspection device 10 according to modification 4 further stores data on information 200 on abnormality detection.

Figure 23:
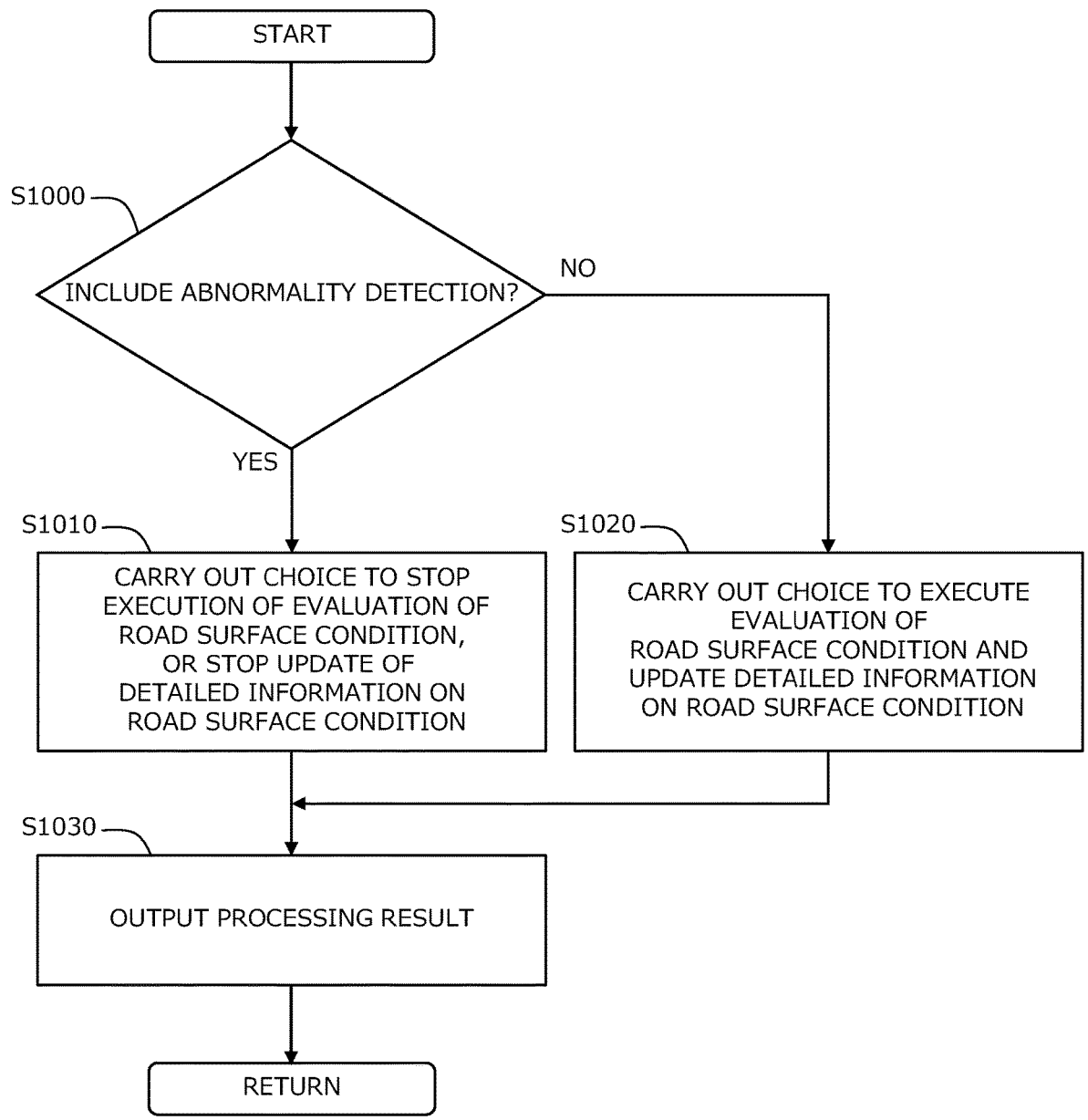
FIG. 23 is a flowchart showing a processing example of the road surface condition inspection device according to modification 4 of the first embodiment.

FIG. 23 is a flowchart showing a processing example of the road surface condition evaluation unit 450 of a road surface condition inspection processing unit 400 in the road surface condition inspection device 10 according to modification 4.

In step S1000, the road surface condition evaluation unit 450 determines whether or not abnormality detection is included.

When it is determined that abnormality detection is included (step S1000; Yes), a process proceeds to step S1010. Otherwise (step S1000; No), the process proceeds to step S1020.

In step S1010, the road surface condition evaluation unit 450 makes a choice to stop execution of evaluation of the road surface condition or stop update of the detailed information 120 on a road surface condition based on latest information on a road surface condition the evaluation of which is performed. Thereafter, the process proceeds to step S1030.

In step S1020, the road surface condition evaluation unit 450 makes a choice to execute evaluation of the road surface condition and update the detailed information 120 on a road surface condition based on the latest information on the road surface condition that is evaluated. Thereafter, the process proceeds to step S1030.

In step S1030, the road surface condition evaluation unit 450 outputs a processing result.

Second Embodiment

Figure 24:
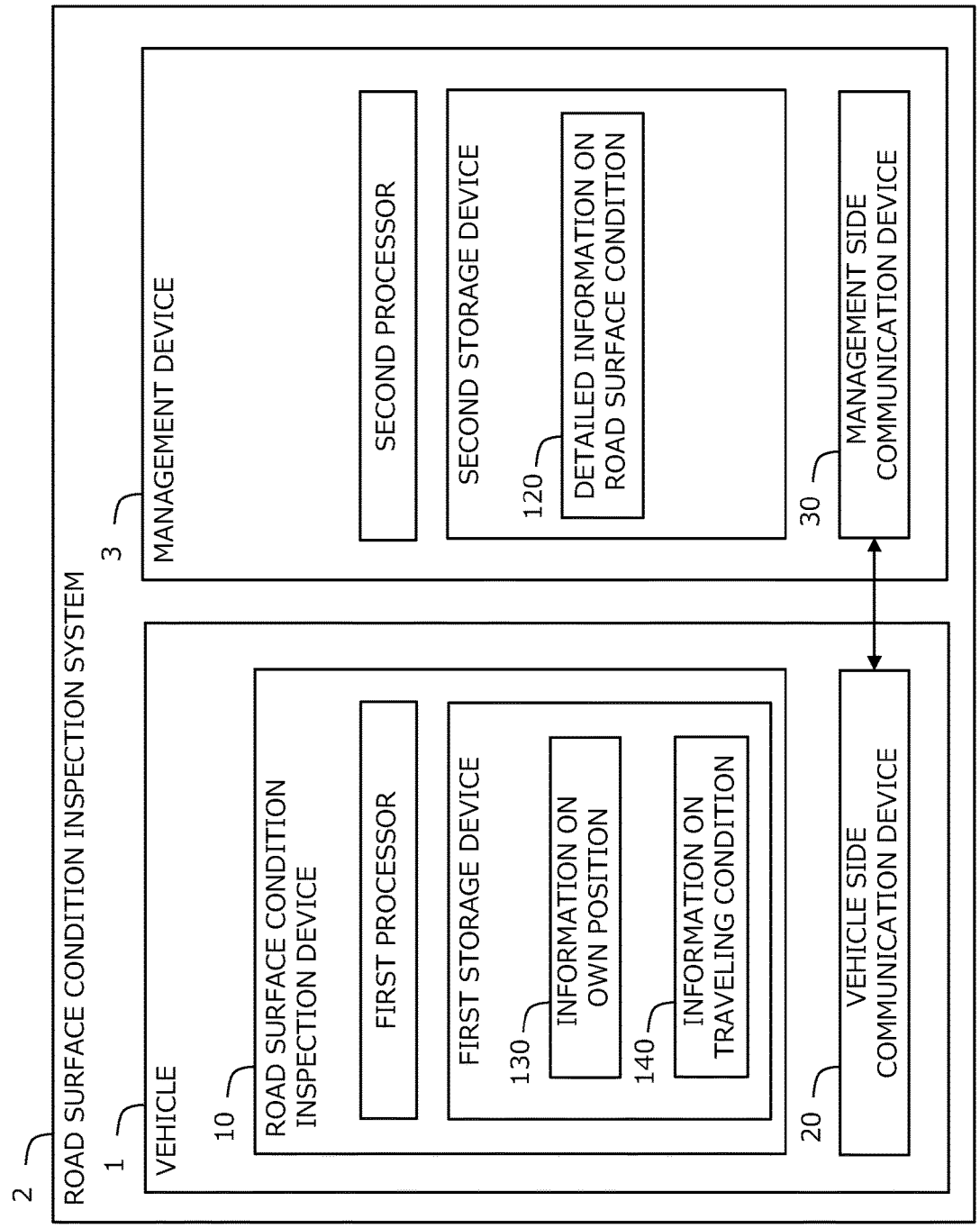
FIG. 24 is a block diagram showing a configuration example of a road surface condition inspection system according to a second embodiment.

A road surface condition inspection system according to a second embodiment includes a vehicle 1, and a management device communicable with the vehicle 1 to perform inspection of a road surface condition. FIG. 24 shows a configuration example of a road surface condition inspection system 2 according to the second embodiment. Note that explanations that overlap with the first embodiment shown in the above are omitted as appropriate. The road surface condition inspection system 2 performs various kinds of information processing. The road surface condition inspection system 2 includes the vehicle 1, and a management device 3 communicable with the vehicle 1. Further, the vehicle 1 includes a road surface condition inspection device 10, and a vehicle side communication device 20. The road surface condition inspection device 10 includes one or a plurality of first processors (hereinafter, simply referred to as a first processor), and one or a plurality of first storage devices (hereinafter, simply referred to as a first storage device). The first processor executes various processes. The first storage device stores data on information 130 on an own position, and data on information 140 of a traveling condition. The first processor executes a first road surface condition inspection program that is a computer program, and thereby a function of the road surface condition inspection device 10 is realized. The first road surface condition inspection program is stored in the first storage device. The first road surface condition inspection program may be recorded in a computer-readable storage medium. The first road surface condition inspection program may be provided via a network.

The management device 3 includes one or a plurality of second processors (hereinafter, simply referred to as a second processor), one or a plurality of storage devices (hereinafter, simply referred to as a second storage device), and a management side communication device 30. The second storage device stores data on detailed information 120 on a road surface condition. The second processor executes a second road surface condition inspection program that is a computer program, and thereby a function of the management device 3 is realized. The second road surface condition inspection program is stored in the second storage device. The second road surface condition inspection program may be recorded in a computer-readable storage medium. The second road surface condition inspection program may be provided via a network.

The first processor of the road surface condition inspection device 10 included in the vehicle 1 executes the first road surface condition inspection program, and thereby obtains the detailed information 120 on a road surface condition from the management device 3. Based on this, inspection of the road surface condition is performed for each inspection point. Furthermore, based on the information 140 on a traveling condition that is obtained during a traveling inspection plan, evaluation of the road surface condition in the inspection point is performed. Thereafter, the evaluation of the road surface condition is transmitted to the management device 3. The second processor included in the management device 3 executes a second road surface condition inspection program, and thereby it is possible to update the detailed information 120 on a road surface condition that is set for the inspection point, based on latest information on the road surface condition the evaluation of which is performed. Thereby, it is possible to share the detailed information 120 on a road surface condition with other vehicles and the like.

Figure 25:
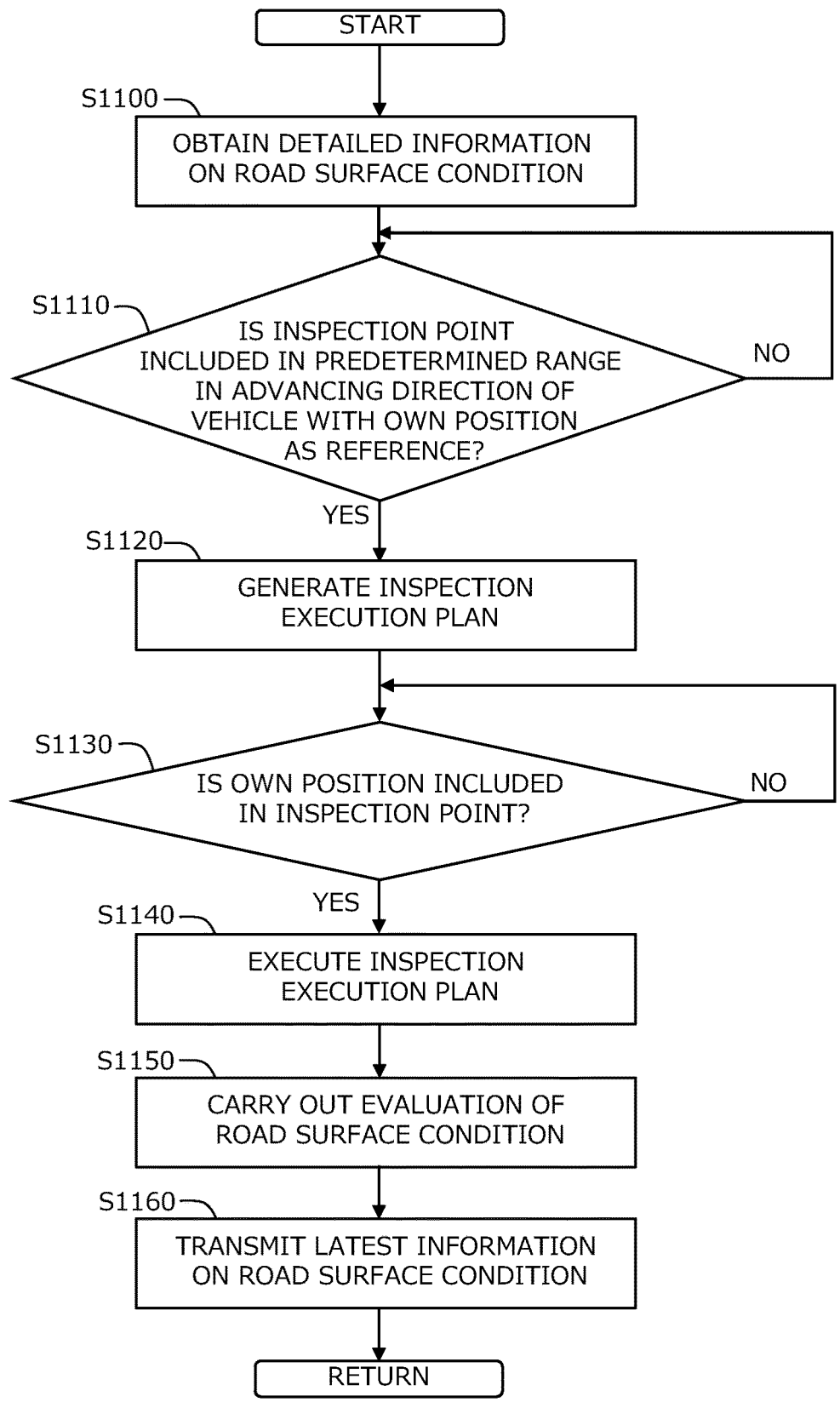
FIG. 25 is a flowchart showing a processing example of the road surface condition inspection system according to the second embodiment.

FIG. 25 is a flowchart showing a processing example of the road surface condition inspection device 10 of the road surface condition inspection system 2 according to the second embodiment.

In step S1100, the road surface condition inspection device 10 obtains the detailed information 120 on a road surface condition from the management device 3 via the vehicle side communication device 20. Thereafter, a process proceeds to step S1110.

In step S1110, the road surface condition inspection device 10 determines whether or not an inspection point is included in a predetermined range in an advancing direction of the vehicle 1 with an own position as a reference based on the information 130 on an own position.

When it is determined that the inspection point is included in the predetermined range in the advancing direction of the vehicle 1 with the own position as the reference (step S1110; Yes), the process proceeds to step S1120. Otherwise (step S1110; No), the process returns to step S1110.

In step S1120, the road surface condition inspection device 10 generates an inspection execution plan. Thereafter, the process proceeds to step S1130.

In step S1130, the road surface condition inspection device 10 determines whether or not the information 130 on an own position is included in the inspection point.

When it is determined that the information 130 on an own position is included in the inspection point (step S1130; Yes), the process proceeds to step S1140. Otherwise (step S1130; No), the process returns to step S1130.

In step S1140, the road surface condition inspection device 10 executes the inspection execution plan. Thereafter, the process proceeds to step S1150.

In step S1150, the road surface condition inspection device 10 performs evaluation of the road surface condition in the inspection point based on the information 140 on a traveling condition of the vehicle 1 that is obtained during the inspection execution plan. Thereafter, the process proceeds to step S1160.

In step S1160, the road surface condition inspection device 10 transmits the latest information on the road surface condition the evaluation of which is performed to the management device 3 via the vehicle side communication device 20.

Modification of Second Embodiment

The management device 3 according to the second embodiment shown in the above performs update of the detailed information on a road surface condition based on the latest information on the road surface condition the evaluation of which is performed by the road surface condition inspection device 10 of the vehicle 1. Thereby, it is possible to share the detailed information on a road surface condition with other vehicles and the like. However, when the latest information on the road surface condition is abnormal, update of the detailed information on a road surface condition is performed based on that information, and the detailed information on a road surface condition that is not appropriate is likely to be shared with other vehicles and the like. Therefore, in a modification of the management device 3 according to the second embodiment, it is determined whether or not the latest information on the road surface condition obtained from the vehicle 1 is abnormal, and based on a result of this, update of the detailed information on a road surface condition is stopped, or update of the detailed information on a road surface condition is executed. Thereby, it is possible to share the detailed information on a road surface condition that is appropriate with other vehicles and the like.

Figure 26:
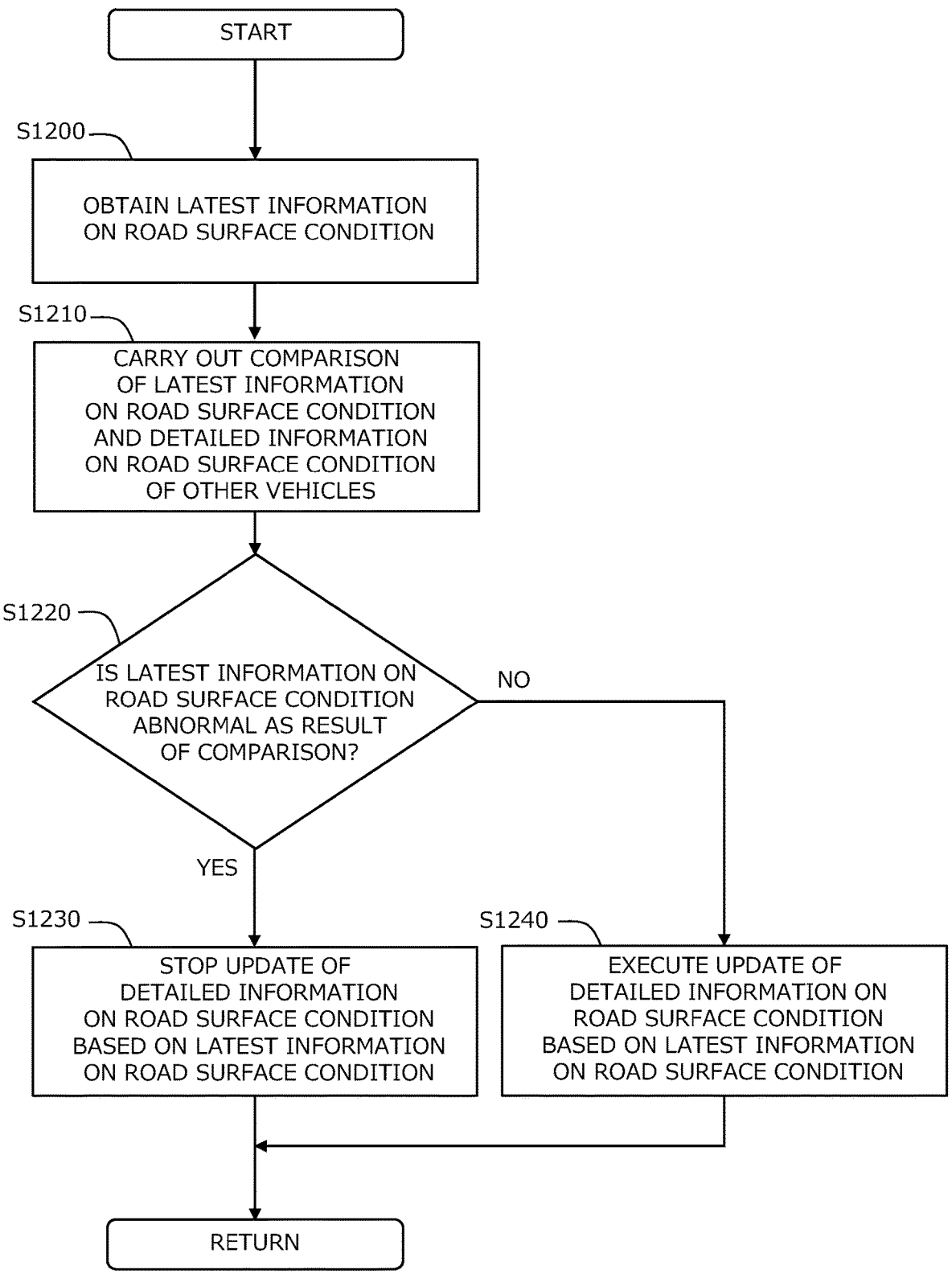
FIG. 26 is a flowchart showing a processing example of a modification of a management device according to the second embodiment.

FIG. 26 is a flowchart showing a processing example of the modification of the management device 3 according to the second embodiment.

In step S1200, the management device 3 obtains latest information on the road surface condition from the vehicle 1 via the management side communication device 30. Thereafter, a process proceeds to step S1210.

In step S1210, the management device 3 performs comparison of the latest information on the road surface condition and the detailed information on a road surface condition based on a traveling record of other vehicles in a same inspection point. Thereafter, the process proceeds to step S1220.

In step S1220, the management device 3 performs determination of whether or not the latest information on the road surface condition is abnormal based on a result of the comparison in step S1210.

When it is determined that the latest information on the road surface condition is abnormal (step S1220; Yes), the process proceeds to step S1230. Otherwise (step S1220; No), the process proceeds to step S1240.

In step S1230, the management device 3 stops update of the detailed information on a road surface condition based on the latest information on the road surface condition. At this time, update of the detailed information on a road surface condition is stopped, and notification of abnormality to the vehicle 1 may be performed.

In step S1240, the management device 3 executes update of the detailed information on a road surface condition based on the latest information on the road surface condition.

Third Embodiment

A road surface condition inspection system 2 according to a third embodiment includes a vehicle 1, and a management device 3 communicable with the vehicle 1 and is for performing inspection of a condition of a road surface. Thereby, it is possible to share detailed information 120 on a road surface condition with other vehicles and the like. A difference from the road surface condition inspection system 2 according to the second embodiment is a sharing range of processes. Specifically, in the road surface condition inspection system 2 according to the second embodiment, the process of performing update of the detailed information 120 on a road surface condition is performed in the management device 3, and the other processes are performed in the road surface inspection device 10 included in the vehicle 1. In contrast to this, in the road surface condition inspection system 2 according to the third embodiment, execution of the inspection execution plan is performed in the road surface condition inspection device 10 included in the vehicle 1, and other processes are performed in the management device 3. Thereby, it is possible to reduce a processing load on the road surface condition inspection device 10 included in the vehicle 1. Note that explanations that overlap with the first embodiment or the second embodiment shown in the above are omitted as appropriate.

Figure 27:
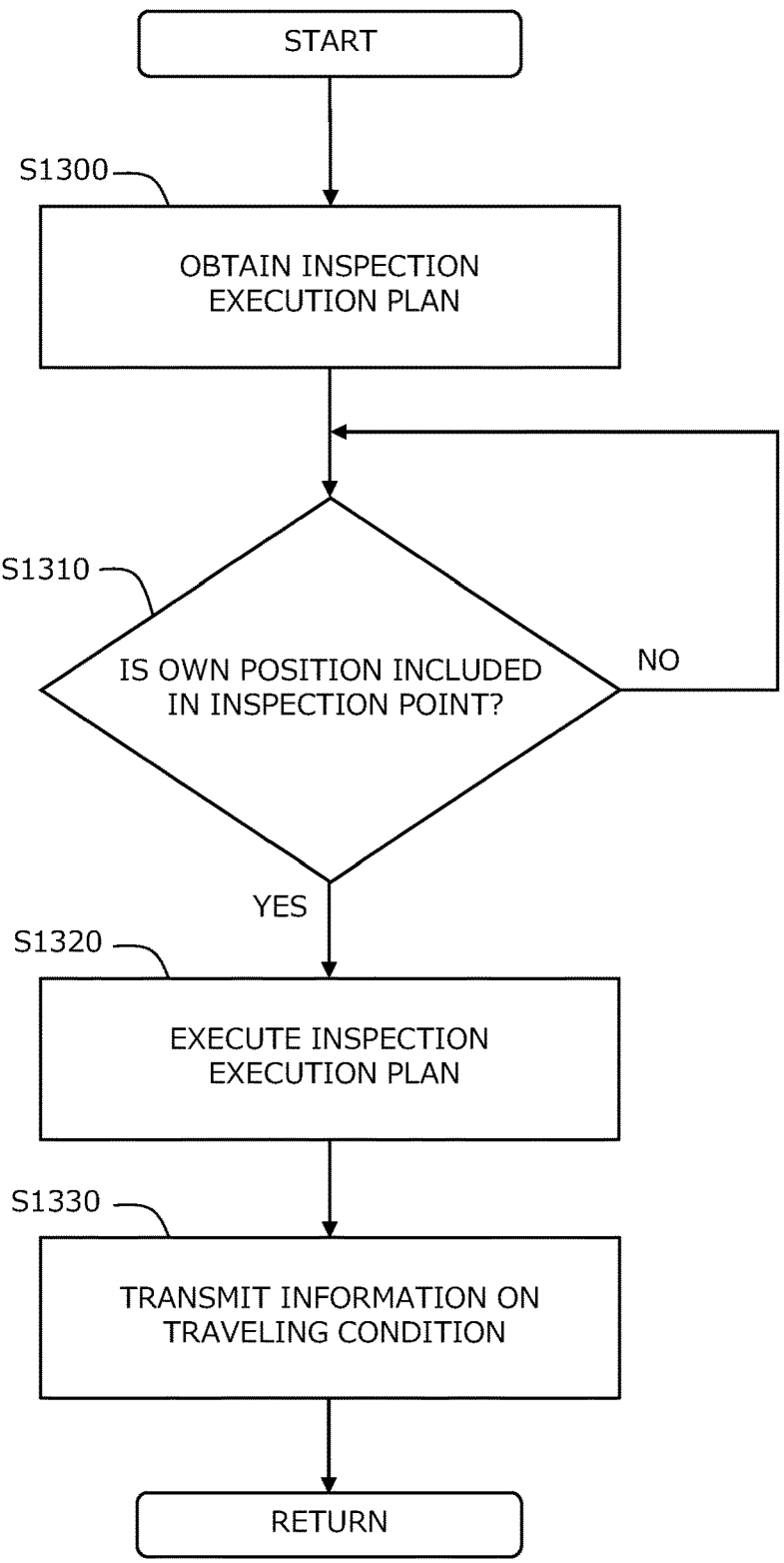
FIG. 27 is a flowchart showing a processing example of a road surface condition inspection system according to a third embodiment.

FIG. 27 is a flowchart showing a processing example of the road surface condition inspection device 10 of the road surface condition inspection system 2 according to the third embodiment.

In step S1300, the road surface condition inspection device 10 obtains an inspection execution plan of the vehicle 1 in an inspection point generated in the management device 3 from the management device 3 via a vehicle side communication device 20. Thereafter, a process proceeds to step S1310.

In step S1310, the road surface condition inspection device 10 determines whether or not information 130 on an own position is included in the inspection point.

When it is determined that the information 130 on an own position is included in the inspection point (step S1310; Yes), the process proceeds to step S1320. Otherwise (step S1310; No), the process returns to step S1310.

In step S1320, the road surface condition inspection device 10 executes the inspection execution plan. Thereafter, the process proceeds to step S1330.

In step S1330, the road surface condition inspection device 10 transmits information 140 on a traveling condition obtained in the inspection execution plan to the management device 3 via the vehicle side communication device 20.

Modification of Third Embodiment

As in the modification of the second embodiment shown in the above, based on latest information on a road surface condition, update of detailed information on a road surface condition may be stopped, or update of the detailed information on a road surface condition may be executed. Accordingly, in a modification of the management device 3 according to the third embodiment, it is determined whether or not the latest information on the road surface condition obtained from the vehicle 1 is abnormal, and based on a result of the determination, update of the detailed information on a road surface condition is stopped, or update of the detailed information on a road surface condition is executed. Thereby, it is possible to share the detailed information on a road surface condition that is appropriate with other vehicles and the like. Note that when update of the detailed information on a road surface condition is stopped, abnormality may be notified to the vehicle 1.

What is claimed is:

1. A method of improved sensing and updating data of a road surface condition of a road on which travel of a vehicle, which is configured at least as an autonomous vehicle, is controlled, the method comprising:
    implementing an obtaining, based on a past traveling record of the vehicle and information on a current own position of the vehicle, of detailed information on the road surface condition,
        the detailed information indicating at least that the road surface condition is set for each of a plurality of inspection points,
        the inspection points comprise a first inspection point and a second inspection point, and
        both relative to an advancing direction of the vehicle as the vehicle is controlled to travel along the road and as the obtaining of the detailed information is implemented, the first inspection point is physically closer to the vehicle than is the second inspection point to the vehicle;
    generating an inspection execution plan instructing the vehicle to perform an evaluation of the road surface condition at the first inspection point and the second inspection point as the vehicle is controlled to travel along the road, and generating the inspection execution plan comprises determining, based on an interval between the first inspection point and the second inspection point, that the vehicle is to, within a predetermined range along the road to the first inspection point and the second inspection point, decelerate along the road relative to approaching the first inspection point thereby increasing a time period in which the vehicle is planned to perform the evaluation at least at one of the first inspection point and the second inspection point;
    controlling, based on the inspection execution plan, the vehicle to travel along the road and to, as the vehicle is controlled to travel along the road, perform the evaluation, and controlling the vehicle to travel along the road comprises controlling the vehicle to both decelerate along the road relative to approaching the first inspection point and to perform at least part of the evaluation as the vehicle is decelerated; and
    updating the detailed information on the road surface condition based on the vehicle performing the evaluation while being controlled to decelerate along the road relative to approaching the first inspection point.

2. The method according to claim 1,
    wherein of generating the inspection execution plan further includes setting a priority order of at least the first inspection point and the second inspection point.

3. The method according to claim 2,
    wherein setting the priority order comprises:
        obtaining information on weather;
        predicting, based on the information on weather, changes in the road surface condition at the first inspection point and the second inspection point; and
        setting the priority order based on at least one of the changes being determined to be a larger change relative to at least one other of the changes.

4. The method according to claim 2,
    wherein setting the priority order comprises:
        obtaining, by controlling a camera mounted on the vehicle, surrounding environment information in the advancing direction of the vehicle;
        predicting, based on the surrounding environment information in the advancing direction of the vehicle, changes in the road surface condition at the first inspection point and the second inspection point; and
        setting the priority based on at least one of the changes being determined to be a larger change relative to at least one other of the changes.

5. The method according to claim 2,
    wherein generating the inspection execution plan comprises determining to control the vehicle to decelerate along the road relative to approaching the first inspection point based on the priority order and on determining an interval between the first inspection point and the second inspection point.

6. The method according to claim 1, further comprising:
    detecting an abnormality of the vehicle while the vehicle is controlled to perform the evaluation according to the inspection execution plan; and
    based on detecting the abnormality, controlling the vehicle to stop performing the evaluation.

7. The method according to claim 1, further comprising:
    determining, before the vehicle is controlled to perform the evaluation according to the inspection execution plan, that a predetermined execution avoidance condition is satisfied; and
    based on determining that the predetermined execution avoidance condition is satisfied, controlling the vehicle to stop performing the evaluation.

8. The method according to claim 7,
    wherein the predetermined execution avoidance condition includes at least one of a fact that an occupant is recognized in an interior of the vehicle, and a fact that an object is recognized in a predetermined area.

9. The method according to claim 1, further comprising:
determining, before generation of the inspection execution plan, that a predetermined generation avoidance condition is satisfied; and
based on determining that the predetermined execution avoidance condition is satisfied, controlling the vehicle to stop performing the evaluation.

10. The method according to claim 1, further comprising:
determining that an object is recognized in a predetermined area; and
changing, based on determining that the object is recognized in the predetermined area and before controlling the vehicle to perform the evaluation according to the inspection execution plan, a travel plan of the vehicle, changing the travel plan includes changing an approach of the vehicle relative to the object.

11. The method according to claim 1,
wherein the detailed information indicates at least one of information on slipperiness of a road surface of the road, information related to unevenness of the road surface, information related to a gradient of the road surface, information related to a shape of the road surface, information on an upper speed limit, and information on an operation record of a traveling safety function of the vehicle.

12. A road surface condition inspection device that performs an improved sensing and updating of data of a road surface condition of a road on which travel of a vehicle, which is configured at least as an autonomous vehicle, is controlled, the road surface condition inspection device comprising:
one or a plurality of storage devices that store detailed information on the road surface condition; and
one or a plurality of processors, wherein
the detailed information indicates at least that the road surface condition is set for each of a plurality of inspection points,
the inspection points comprise a first inspection point and a second inspection point, and
both relative to an advancing direction of the vehicle as the vehicle is controlled to travel along the road and at least at a time of generating an inspection execution plan, the first inspection point is physically closer to the vehicle than is the second inspection point to the vehicle, and
wherein the one or the plurality of processors is configured to:
generate an inspection execution plan instructing the vehicle to perform an evaluation of the road surface condition at the first inspection point and the second inspection point as the vehicle is controlled to travel along the road, and generating the inspection execution plan comprises determining, based on an interval between the first inspection point and the second inspection point, that the vehicle is to, within a predetermined range along the road to the first inspection point and the second inspection point, decelerate along the road relative to approaching the first inspection point thereby increasing a time period in which the vehicle is planned to perform the evaluation at least at one of the first inspection point and the second inspection point;
controlling, based on the inspection execution plan, the vehicle to travel along the road and to, as the vehicle is controlled to travel along the road, perform the evaluation, and controlling the vehicle to travel along the road comprises controlling the vehicle to both decelerate along the road relative to approaching the first inspection point and to perform at least part of the evaluation as the vehicle is decelerated; and
updating the detailed information on the road surface condition based on the vehicle performing the evaluation while being controlled to decelerate along the road relative to approaching the first inspection point.

13. A road surface condition inspection system that performs an improved sensing and updating of data of a road surface condition of a road on which travel of a vehicle, which is configured at least as an autonomous vehicle, is controlled, the road surface condition inspection system comprising:
the vehicle; and
a management device communicable with the vehicle,
wherein the vehicle comprises a road surface condition inspection device including a first processor and a first storage device, and a vehicle side communication device,
the management device comprises a second processor, a second storage device, and a management side communication device,
the first storage device includes information on an own position of the vehicle,
the second storage device includes detailed information on the road surface condition, wherein
the detailed information indicates at least that the road surface condition is set for each of a plurality of inspection points,
the inspection points comprise a first inspection point and a second inspection point, and
both relative to an advancing direction of the vehicle as the vehicle is controlled to travel along the road and at least at a time of generating an inspection execution plan, the first inspection point is physically closer to the vehicle than is the second inspection point to the vehicle,
wherein the first processor is configured to:
generate an inspection execution plan instructing the vehicle to perform an evaluation of the road surface condition at the first inspection point and the second inspection point as the vehicle is controlled to travel along the road, and generating the inspection execution plan comprises determining, based on an interval between the first inspection point and the second inspection point, that the vehicle is to, within a predetermined range along the road to the first inspection point and the second inspection point, decelerate along the road relative to approaching the first inspection point thereby increasing a time period in which the vehicle is planned to perform the evaluation at least at one of the first inspection point and the second inspection point; and
control, based on the inspection execution plan, the vehicle to travel along the road and to, as the vehicle is controlled to travel along the road, perform the evaluation, and controlling the vehicle to travel along the road comprises controlling the vehicle to both decelerate along the road relative to approaching the first inspection point and to perform at least part of the evaluation as the vehicle is decelerated; and
transmit, to the second processor, latest information on the road surface condition obtained based on controlling the vehicle to perform the evaluation, and the second processor is configured to:
update the detailed information on the road surface condition based on the latest information received from the first processor.

14. The system according to claim 13,
wherein the second processor is further configured to:
before updating the detailed information based on the latest information:
determine that the latest information is not abnormal based on a result of comparing the latest information and to previous information of the road surface condition as indicated to the management device by at least one other vehicle; and
determining, based on determining that the latest information on the road surface condition is not abnormal, to proceed with updating the detailed information on the road surface condition based on the latest information received from the first processor.

15. The system according to claim 13, wherein the inspection execution plan further indicates that the vehicle is to accelerate after decelerating and relative to the vehicle travelling passed the second inspection point after travelling passed the first inspection point, and
the first processor controlling the vehicle to travel along the road and to perform the evaluation further comprises the first processor controlling the vehicle to accelerate after decelerating and relative to the vehicle travelling passed the second inspection point after travelling passed the first inspection point.

16. The system according to claim 13, wherein the second processor is further configured to share, over a network and with a plurality of vehicles including the vehicle and at least one second other vehicle, the detailed information on the road surface condition as updated based on the latest information received from the first processor.

\* \* \* \* \*